United States Patent
Park et al.

(10) Patent No.: US 11,050,473 B2
(45) Date of Patent: Jun. 29, 2021

(54) METHOD AND APPARATUS FOR CONTROLLING ANTENNA FOR INTER-VEHICLE COMMUNICATION

(71) Applicant: LG Electronics Inc., Seoul (KR)

(72) Inventors: Suho Park, Seoul (KR); Cheolseung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/742,584

(22) Filed: Jan. 14, 2020

(65) Prior Publication Data

US 2020/0153494 A1   May 14, 2020

(30) Foreign Application Priority Data

Nov. 22, 2019   (KR) .................. 10-2019-0151516

(51) Int. Cl.
*H04B 7/06* (2006.01)
*G08G 1/00* (2006.01)
*H04W 4/46* (2018.01)

(52) U.S. Cl.
CPC ............. *H04B 7/0617* (2013.01); *G08G 1/22* (2013.01); *H04W 4/46* (2018.02)

(58) Field of Classification Search
CPC .......... H04B 7/0617; H04W 4/46; G08G 1/22
See application file for complete search history.

(56) References Cited

U.S. PATENT DOCUMENTS

| | | | |
|---|---|---|---|
| 10,259,456 B2* | 4/2019 | Park ..................... | H04L 67/12 |
| 10,482,767 B2* | 11/2019 | Miller, Jr. ............ | B60W 30/165 |
| 10,520,952 B1* | 12/2019 | Luckevich ............ | B60W 10/18 |
| 2014/0316671 A1* | 10/2014 | Okamoto ................ | G08G 1/22 |
| | | | 701/96 |
| 2017/0289864 A1* | 10/2017 | Narasimha ........ | H04W 36/0009 |
| 2018/0278385 A1* | 9/2018 | Wu ...................... | G05D 1/0295 |
| 2018/0279096 A1* | 9/2018 | Wu .......................... | G08G 1/22 |
| 2020/0077279 A1* | 3/2020 | Foerster .................. | H04W 4/40 |

* cited by examiner

*Primary Examiner* — Jaison Joseph
(74) *Attorney, Agent, or Firm* — Fish & Richardson P.C.

(57) ABSTRACT

At least one of an autonomous vehicle, a user terminal, and a server may be connected or converged with an artificial intelligence (AI) module, an unmanned aerial vehicle (UAV), a robot, an augmented reality (AR) device, a virtual reality (VR) device, a device associated with a 5G service, and the like. Provided is a communication method of a mobile communication terminal, the method including identifying at least one target platoon for signal transmission, acquiring information related to driving of the at least one target platoon, identifying antenna heading corresponding to the information related to driving, and transmitting a signal to the at least one target platoon based on the antenna heading.

20 Claims, 19 Drawing Sheets

FIG. 11
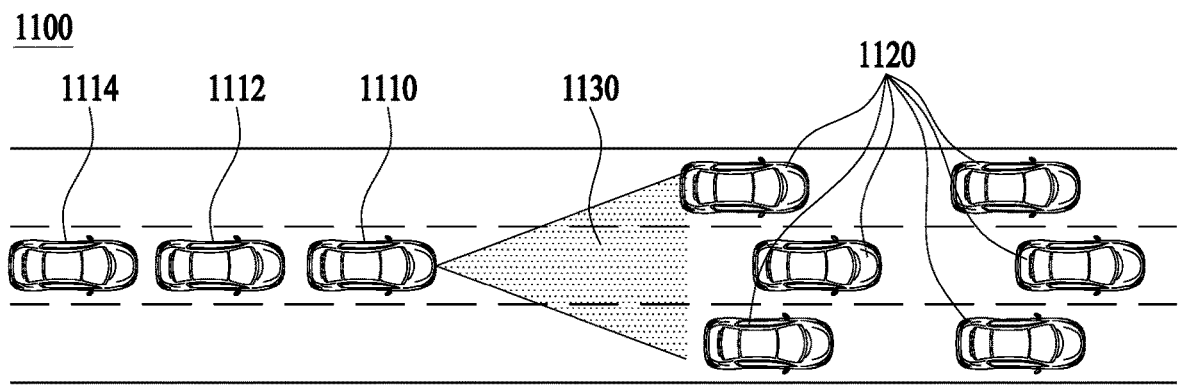
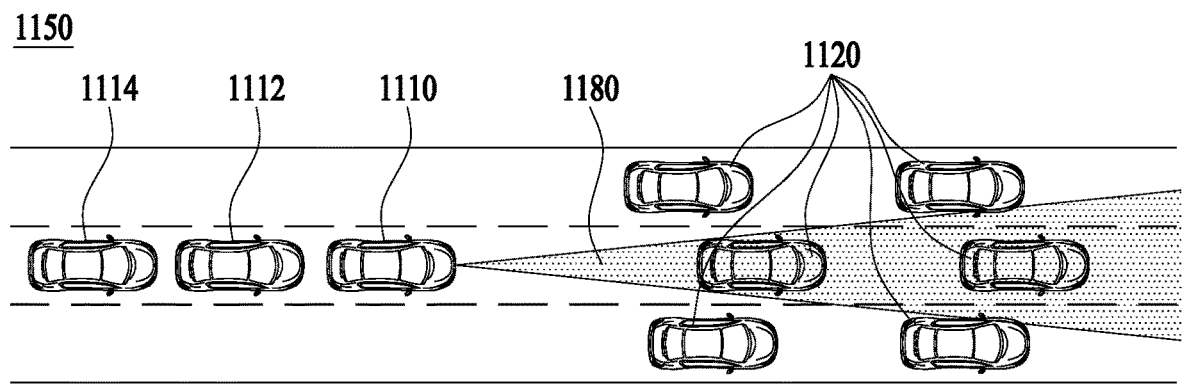

METHOD AND APPARATUS FOR CONTROLLING ANTENNA FOR INTER-VEHICLE COMMUNICATION

CROSS-REFERENCE TO RELATED APPLICATION

This application claims the benefit of Korean Patent Application No. 10-2019-0151516, filed on Nov. 22, 2019, the disclosure of which is incorporated herein in its entirety by reference.

BACKGROUND

1. Field

The present disclosure relates to a method for controlling an antenna for inter-vehicle communication and an apparatus using the same, and one particular implementation relates to a method and apparatus for controlling an antenna to effectively transmit and receive signals between vehicles based on traveling information of the vehicles.

2. Description of the Related Art

Mobile terminals for performing wireless communication may transmit and receive signals to and from a base station or another terminal. Functions of the mobile terminals are becoming diversified. For example, the functions of the mobile terminal include data and voice communication, taking a photo or a video using a camera, recording voice, playing a music file using a speaker system, and outputting an image or a video on a display. Some terminals further include an electronic game function or implement a multimedia player function. In particular, recently developed mobile terminals may receive a multi-cast signal for providing a visual content such as a broadcast, a video, and a TV program. Since functions of the terminals have been diversified, the terminals have been implemented as a multimedia player having complex functions that are, for example, taking a photo or a video, playing a music or video file, receiving a broadcast, and performing inter-vehicle communication which has been recently increasingly demanded to implement autonomous driving.

In order to reliably perform high capacity communication, it is necessary to improve performance of a wireless terminal. Accordingly, as a communication service of a vehicle-related terminal, there are increasing demands for not just an existing communication service such as Long Term Evolution (LTE), but also a wireless terminal to which New RAT, a next-generation communication service, can be applied.

In order to use the aforementioned communication system, there is need of a method for mounting a vehicular antenna system with respect to a terminal mounted in a vehicle and performing communication effectively. Yet, how to implement such a method has not been suggested in detail. In addition, the vehicular antenna system needs to support not just a 5G communication system, but also an existing communication service such as LTE. Regarding this, in order to improve a transmission rate, LTE should support a Multi-Input Multi-Output (MIMO) mode and secure communication performance corresponding to mobility due to characteristics of a vehicle. However, it is difficult to perform effective communication in this situation using the existing terminal structure.

Therefore, there is need of a configuration of a wireless terminal capable of performing communication effectively and a communication method using the wireless terminal.

SUMMARY

An aspect provides a method and an apparatus for effectively performing inter-vehicle communication. Specifically, an aspect provides a method and an apparatus for effectively performing inter-vehicle by exchanging traveling related information for the inter-vehicle communication, by identifying a transmission target point for the inter-vehicle communication, and by adaptively controlling a transmitting scheme based on the identified target point.

According to an aspect, there is provided a communication method of a mobile communication terminal, the method including identifying at least one target platoon for signal transmission, acquiring information related to driving of the at least one target platoon, identifying antenna heading corresponding to the information related to driving, and transmitting a signal to the at least one target platoon based on the antenna heading.

According to another aspect, there is provided a mobile communication terminal including a transceiver and a controller configured to control the transceiver, identify at least one target platoon for signal transmission, acquire information related to driving of the at least one target platoon, identify antenna heading corresponding to the information related to driving, and transmit a signal to the at least one target platoon based on the antenna heading.

BRIEF DESCRIPTION OF THE DRAWINGS

The above and other aspects, features, and advantages of certain embodiments will be more apparent from the following detailed description taken in conjunction with the accompanying drawings, in which:

FIG. 11 is a diagram illustrating a signal transmitting scheme taking into consideration a speed of a vehicle and information regarding other vehicles according to an embodiment of the present disclosure.

DETAILED DESCRIPTION

Figure 1:
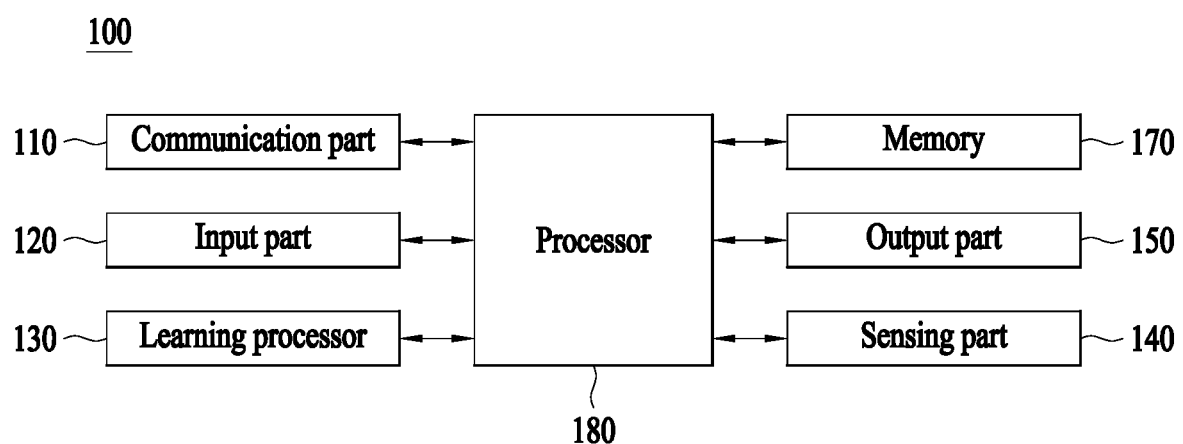
FIG. 1 illustrates an artificial intelligence (AI) device according to an example embodiment.

Embodiments of the disclosure will be described hereinbelow with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

Exemplary embodiments of the present disclosure are described in detail with reference to the accompanying drawings.

Detailed descriptions of technical specifications well-known in the art and unrelated directly to the present disclosure may be omitted to avoid obscuring the subject matter of the present disclosure. This aims to omit unnecessary description so as to make clear the subject matter of the present disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

In addition, a controller mentioned in the embodiments may include at least one processor that is operated to control a corresponding apparatus.

Artificial Intelligence refers to the field of studying artificial intelligence or a methodology capable of making the artificial intelligence. Machine learning refers to the field of studying methodologies that define and solve various problems handled in the field of artificial intelligence. Machine learning is also defined as an algorithm that enhances the performance of a task through a steady experience with respect to the task.

An artificial neural network (ANN) is a model used in machine learning, and may refer to a general model that is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output input signals that are input through the synapse, weights, and the value of an activation function concerning deflection.

Model parameters refer to parameters determined by learning, and include weights for synaptic connection and deflection of neurons, for example. Then, hyper-parameters mean parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function maybe used as an index for determining an optimal model parameter in a learning process of the artificial neural network.

Machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by an artificial neural network when learning data is input to the artificial neural network. The unsupervised learning may refer to a learning method for an artificial neural network in the state in which no label for learning data is given. The reinforcement learning may mean a learning method in which an agent defined in a certain environment learns to select a behavior or a behavior sequence that maximizes cumulative compensation in each state.

Machine learning realized by a deep neural network (DNN) including multiple hidden layers among artificial neural networks is also called deep learning, and deep learning is a part of machine learning. Hereinafter, machine learning is used as a meaning including deep learning.

The term "autonomous driving" refers to a technology of autonomous driving, and the term "autonomous vehicle" refers to a vehicle that travels without a user's operation or with a user's minimum operation.

For example, autonomous driving may include all of a technology of maintaining the lane in which a vehicle is driving, a technology of automatically adjusting a vehicle speed such as adaptive cruise control, a technology of causing a vehicle to automatically drive along a given route, and a technology of automatically setting a route, along which a vehicle drives, when a destination is set.

At this time, an autonomous vehicle may be seen as a robot having an autonomous driving function.

FIG. 1 illustrates an AI device 100 according to an embodiment of the present disclosure.

The AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle. The AI device may include an operating apparatus related to at least one of a vehicle or a server.

Referring to FIG. 1, a terminal 100 may include a communication part 110, an input part 120, a learning processor 130, a sensing part 140, an output part 150, a memory 170, and a processor 180, for example.

The communication part 110 may transmit and receive data to and from external devices, such as other AI devices 100a to 100e and an AI server 200, using wired/wireless communication technologies. For example, the communication part 110 may transmit and receive sensor information, user input, learning models, and control signals, for example, to and from external devices.

In this case, the communication technology used by the communication part 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

The input part 120 may acquire various types of data.

In this case, the input part 120 may include a camera for the input of an image signal, a microphone for receiving an audio signal, and a user input part for receiving information input by a user, for example. Here, the camera or the microphone may be handled as a sensor, and a signal acquired from the camera or the microphone may be referred to as sensing data or sensor information.

The input part 120 may acquire, for example, input data to be used when acquiring an output using learning data for model learning and a learning model. Input part 120 may acquire unprocessed input data, and in this case, the processor 180 or the learning processor 130 may extract an input feature as pre-processing for the input data.

The learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

In this case, the learning processor 130 may perform AI processing along with a learning processor 240 of the AI server 200.

In this case, the learning processor 130 may include a memory integrated or embodied in the AI device 100. Alternatively, the learning processor 130 may be realized using the memory 170, an external memory directly coupled to AI device 100, or a memory held in an external device. The AI device 100 may be related to the vehicle and may perform an operation required for resource management of the vehicle.

The sensing part 140 may acquire at least one of internal information of the AI device 100 and surrounding environmental information and user information of the AI device 100 using various sensors.

In this case, the sensors included in the sensing part 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar, for example.

The output part 150 may generate, for example, a visual output, an auditory output, or a tactile output.

In this case, the output part 150 may include, for example, a display that outputs visual information, a speaker that outputs auditory information, and a haptic module that outputs tactile information.

The memory 170 may store data which assists various functions of the AI device 100. For example, the memory 170 may store input data acquired by the input part 120, learning data, learning models, and learning history, for example.

The processor 180 may determine at least one executable operation of the AI device 100 based on information determined or generated using a data analysis algorithm or a machine learning algorithm. Then, the processor 180 may control constituent elements of the AI device 100 to perform the determined operation.

To this end, the processor 180 may request, search, receive, or utilize data of the learning processor 130 or the memory 170, and may control the constituent elements of the AI device 100 so as to execute a predictable operation or an operation that is deemed desirable among the at least one executable operation.

In this case, when connection of an external device is necessary to perform the determined operation, the processor 180 may generate a control signal for controlling the external device and may transmit the generated control signal to the external device.

The processor 180 may acquire intention information with respect to user input and may determine a user request based on the acquired intention information.

In this case, the processor 180 may acquire intention information corresponding to the user input using at least one of a speech to text (STT) engine for converting voice input into a character string and a natural language processing (NLP) engine for acquiring natural language intention information.

In this case, at least a part of the STT engine and/or the NLP engine may be configured with an artificial neural network learned according to a machine learning algorithm. Then, the STT engine and/or the NLP engine may have learned by the learning processor 130, may have learned by a learning processor 240 of the AI server 200, or may have learned by distributed processing of the processors 130 and 240.

The processor 180 may collect history information including, for example, the content of an operation of the AI device 100 or feedback of the user with respect to an operation, and may store the collected information in the memory 170 or the learning processor 130, or may transmit the collected information to an external device such as the AI server 200. The collected history information may be used to update a learning model.

The processor 180 may control at least some of the constituent elements of the AI device 100 in order to drive an application program stored in the memory 170. Moreover, the processor 180 may combine and operate two or more of the constituent elements of the AI device 100 for the driving of the application program.

Figure 2:
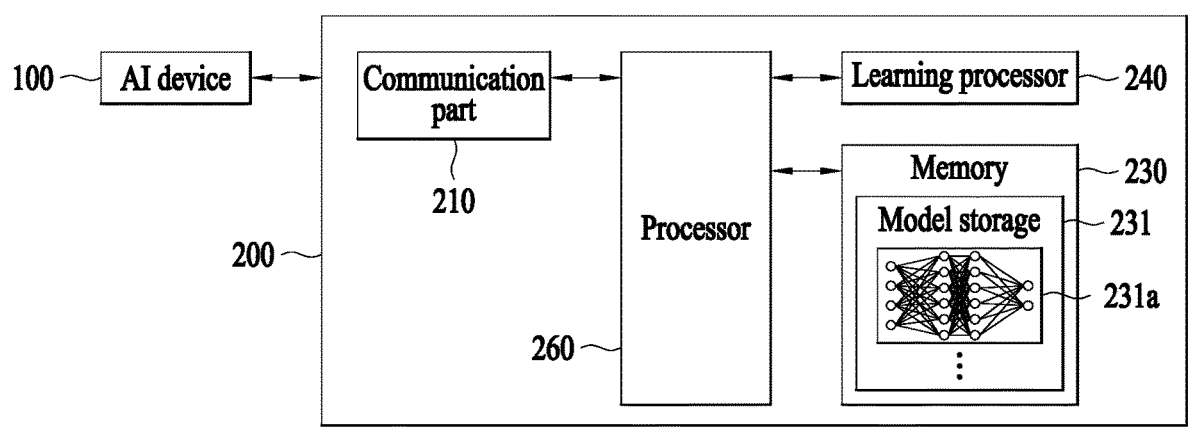
FIG. 2 illustrates an AI server according to an example embodiment.

FIG. 2 illustrates an AI server 200 according to an embodiment of the present disclosure.

Referring to FIG. 2, the AI server 200 may refer to a device that causes an artificial neural network to learn using a machine learning algorithm or uses the learned artificial neural network. Here, the AI server 200 may be constituted of multiple servers to perform distributed processing, and may be defined as a 5G network. In this case, the AI server 200 may be included as a constituent element of an AI device 100 so as to perform at least a part of AI processing together with the AI device 100.

The AI server 200 may include a communication part 210, a memory 230, a learning processor 240, and a processor 260, for example.

The communication part 210 may transmit and receive data to and from an external device such as the AI device 100.

The memory 230 may include a model storage unit 231. Model storage unit 231 may store a model (or an artificial neural network) 231a which is learning or has learned via the learning processor 240.

The learning processor 240 may cause artificial neural network 231a to learn learning data. A learning model may be used in the state of being mounted in the AI server 200 of the artificial neural network, or may be used in the state of being mounted in an external device such as the AI device 100.

The learning model may be realized in hardware, software, or a combination of hardware and software. In the case in which a part or the entirety of the learning model is realized in software, one or more instructions constituting the learning model may be stored in the memory 230.

The processor 260 may deduce a result value for newly input data using the learning model, and may generate a response or a control instruction based on the deduced result value.

The AI server may include a server that generates a VM related to the vehicle and drives the VM. The server may perform learning based on data on generation and driving of the VM, and perform an operation to optimize such learning process.

Figure 3:
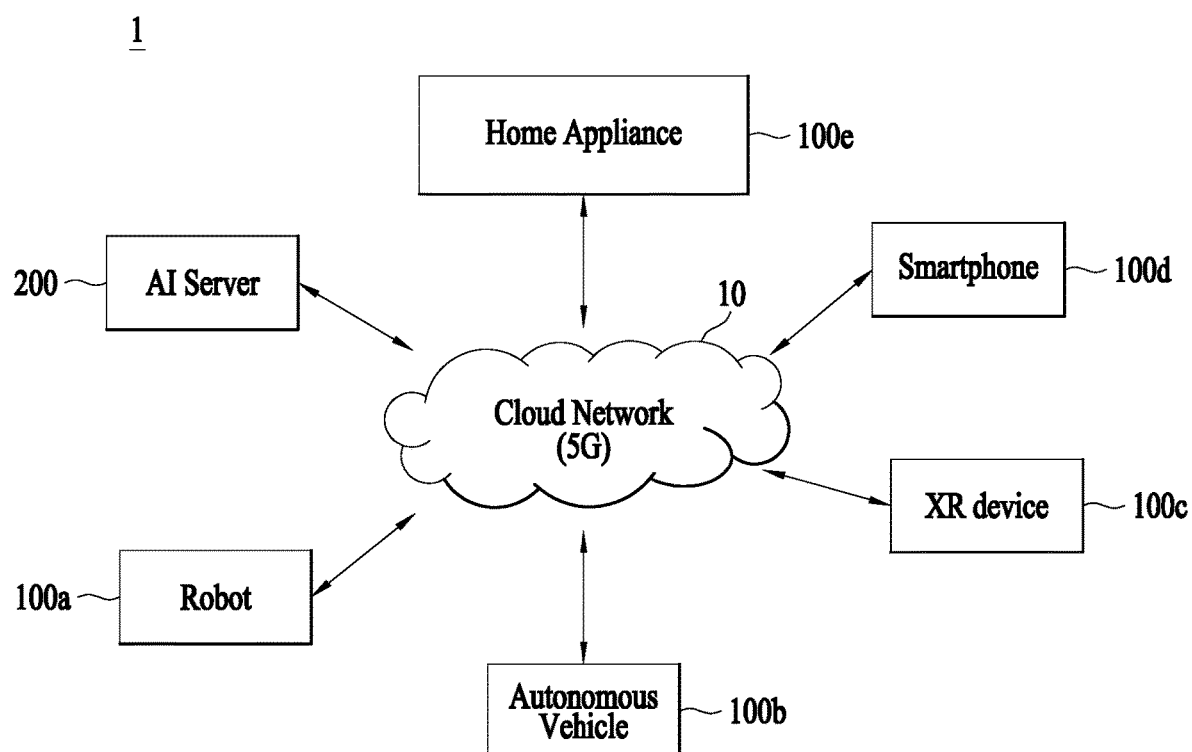
FIG. 3 illustrates an AI system according to an example embodiment.

FIG. 3 illustrates an AI system 1 according to an embodiment of the present disclosure.

Referring to FIG. 3, in the AI system 1, at least one of the AI server 200, a robot 100a, an autonomous vehicle 100b, an XR device 100c, a smart phone 100d, and a home appliance 100e is connected to a cloud network 10. Here, the robot 100a, the autonomous vehicle 100b, the XR device 100c, the smart phone 100d, and the home appliance 100e, to which AI technologies are applied, may be referred to as the AI devices 100a to 100e.

The cloud network 10 may constitute a part of a cloud operating infra-structure, or may mean a network present in the cloud operating infra-structure. Here, the cloud network 10 may be configured using a 3G network, a 4G or long term evolution (LTE) network, or a 5G network, for example.

That is, the respective devices 100a to 100e and 200 constituting the AI system 1 may be connected to each other via the cloud network 10. In particular, the respective devices 100a to 100e and 200 may communicate with each other via a base station, or may perform direct communication without the base station.

The AI server 200 may include a server which performs AI processing and a server which performs an operation with respect to big data.

The AI server 200 may be connected to at least one of the robot 100a, the autonomous vehicle 100b, the XR device 100c, the smart phone 100d, and the home appliance 100e, which are AI devices constituting the AI system 1, via the cloud network 10, and may assist at least a part of AI processing of the connected AI devices 100a to 100e.

In this case, instead of the AI devices 100a to 100e, the AI server 200 may cause an artificial neural network to learn according to a machine learning algorithm, and may directly store a learning model or may transmit the learning model to the AI devices 100a to 100e.

In this case, the AI server 200 may receive input data from the AI devices 100a to 100e, may deduce a result value for the received input data using the learning model, and may generate a response or a control instruction based on the deduced result value to transmit the response or the control instruction to the AI devices 100a to 100e.

Alternatively, the AI devices 100a to 100e may directly deduce a result value with respect to input data using the learning model, and may generate a response or a control instruction based on the deduced result value.

Hereinafter, various embodiments of the AI devices 100a to 100e, to which the above-described technology is applied, will be described. Here, the AI devices 100a to 100e illustrated in FIG. 3 may be specific embodiments of AI device 100 illustrated in FIG. 1.

The autonomous vehicle 100b may be realized into a mobile robot, a vehicle, or an unmanned air vehicle, for example, through the application of AI technologies.

The autonomous vehicle 100b may include an autonomous driving control module for controlling an autonomous driving function, and the autonomous driving control module may mean a software module or a chip realized in hardware. The autonomous driving control module may be a constituent element included in the autonomous vehicle 100b, but may be a separate hardware element outside the autonomous vehicle 100b so as to be connected to the autonomous vehicle 100b.

The autonomous vehicle 100b may acquire information on the state of the autonomous vehicle 100b using sensor information acquired from various types of sensors, may detect (recognize) the surrounding environment and an object, may generate map data, may determine a movement route and a driving plan, or may determine an operation.

Here, the autonomous vehicle 100b may use sensor information acquired from at least one sensor among a lidar, a radar, and a camera in the same manner as the robot 100a in order to determine a movement route and a driving plan.

In particular, the autonomous vehicle 100b may recognize the environment or an object with respect to an area outside the field of vision or an area located at a predetermined distance or more by receiving sensor information from external devices, or may directly receive recognized information from external devices.

The autonomous vehicle 100b may perform the above-described operations using a learning model configured with at least one artificial neural network. For example, the autonomous vehicle 100b may recognize the surrounding environment and the object using the learning model, and may determine a driving line using the recognized surrounding environment information or object information. Here, the learning model may be directly learned in the autonomous vehicle 100b, or may be learned in an external device such as the AI server 200.

In this case, the autonomous vehicle 100b may generate a result using the learning model to perform an operation, but may transmit sensor information to an external device such as the AI server 200 and receive a result generated by the external device to perform an operation.

The autonomous vehicle 100b may determine a movement route and a driving plan using at least one of map data, object information detected from sensor information, and object information acquired from an external device, and a drive unit may be controlled to drive the autonomous vehicle 100b according to the determined movement route and driving plan.

The map data may include object identification information for various objects arranged in a space (e.g., a road) along which the autonomous vehicle 100b drives. For example, the map data may include object identification information for stationary objects, such as streetlights, rocks, and buildings, and movable objects such as vehicles and pedestrians. Then, the object identification information may include names, types, distances, and locations, for example.

In addition, the autonomous vehicle 100b may perform an operation or may drive by controlling the drive unit based on user control or interaction. In this case, the autonomous vehicle 100b may acquire interactional intention information depending on a user operation or voice expression, and may determine a response based on the acquired intention information to perform an operation.

Figure 4:
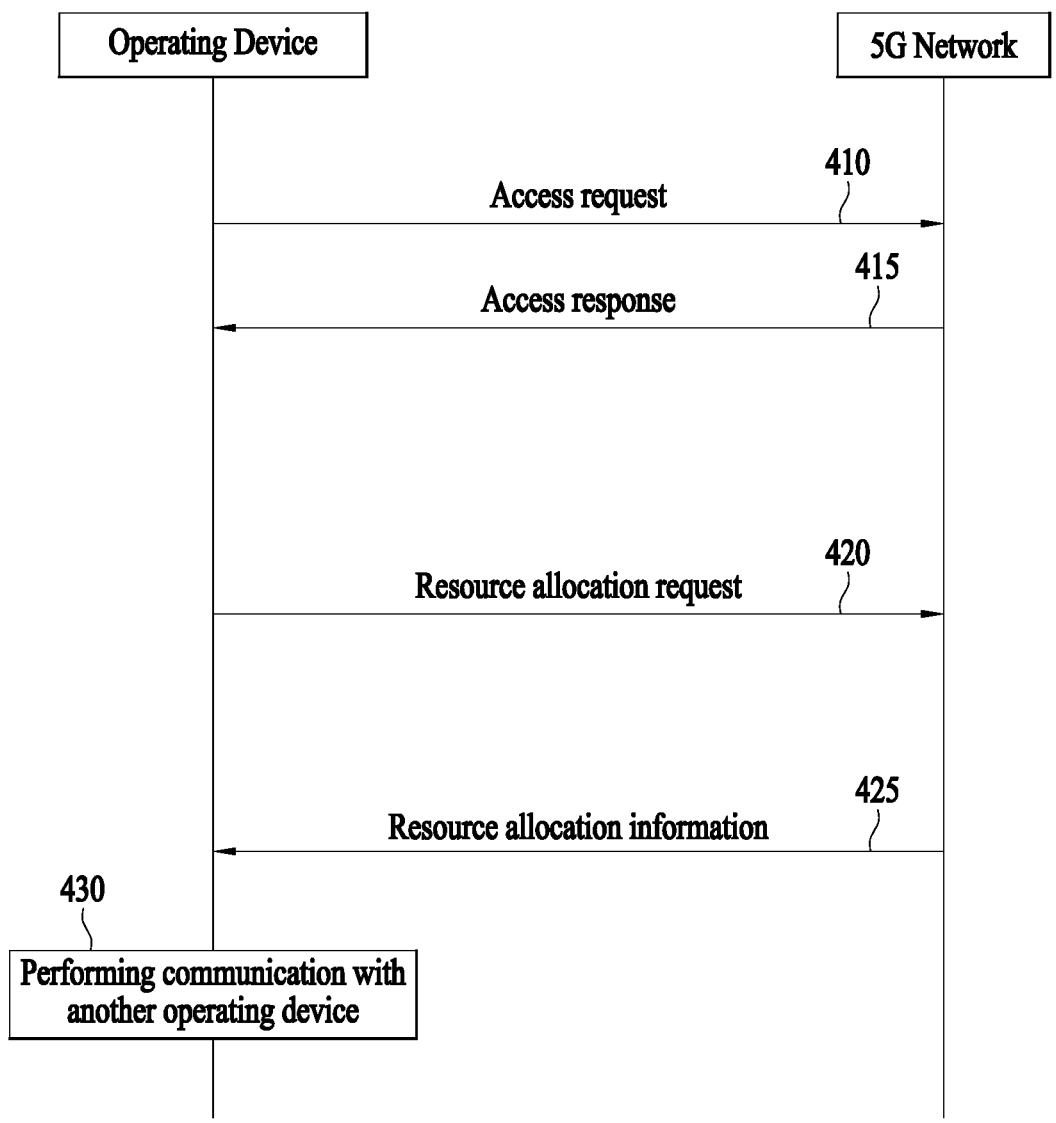
FIG. 4 is a diagram illustrating an operation of controlling a vehicle in response to information being transmitted and received between an operating device and a 5G network according to an example embodiment.

FIG. 4 is a diagram illustrating an operation of controlling a vehicle in response to information being transmitted and received between an operating device and a 5G network according to an example embodiment.

FIG. 4 illustrates a communication method performed between an operating device and a 5G network. In operation 410, the operating device may transmit an access request to the 5G network.

In operation 415, the 5G network may transmit a response to the access request to the operating device. The response to the access request, for example, an access response, may include identification information to be used when the operating device receives information. Also, the access response may include wireless resource allocation information for transmitting and receiving information of the operating device.

In operation 420, the operating device may transmit a wireless resource allocation request for communicating with another device or a base station based on the received information. The wireless resource allocation request may include at least one of information on an operating device and information on a counterpart node for performing communication.

In operation 425, the 5G network may transmit wireless resource allocation information to the operating device. The wireless resource allocation information may be determined based on at least a portion of the information transmitted in operation 420. For example, information associated with resources allocated to communicate with another operating device and identification information to be used for the corresponding communication may be included in the wireless resource allocation information. For example, communication with another operating device may be performed on a channel for device-to-device communication.

In operation 430, the operating device may perform communication with another operating device based on the received information.

Figure 5:
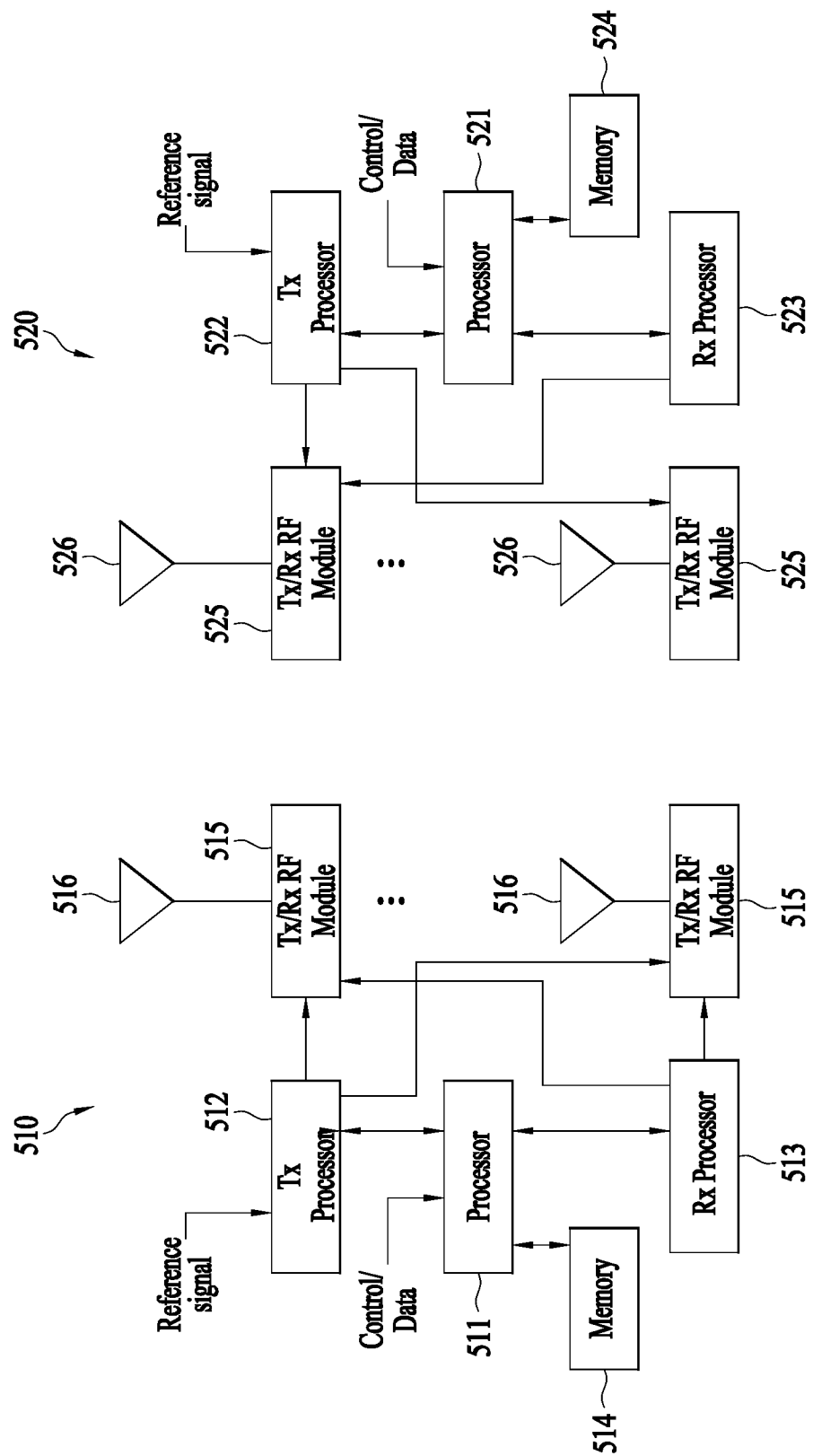
FIG. 5 is a block diagram illustrating a wireless communication system to which a method according to an example embodiment can be applied.

FIG. 5 is a block diagram of a wireless communication system to which a method according to an embodiment of the present disclosure can be applied.

Referring to FIG. 5, an apparatus (an autonomous driving apparatus) including an autonomous driving module may be defined as a first communication device 510, and a processor 511 may perform detailed autonomous driving operations.

A 5G network including another vehicle capable of communicating with the autonomous driving apparatus may be defined as a second communication device 520, and a processor 521 may perform detailed autonomous driving operations.

The 5G network may be expressed as a first communication device, and the autonomous driving apparatus may be expressed as a second communication device.

For example, the first communication device or the second communication device may be a base station, a network node, a Tx terminal, an Rx terminal, a wireless device, a wireless communication device, an autonomous driving apparatus, etc.

For example, a terminal or User Equipment (UE) may include a vehicle, a mobile phone, a smart phone, a laptop computer, a personal digital assistant (PDA), a portable multimedia player (PMP), a navigation, a slate PC, a tablet PC, an ultrabook, a wearable device (e.g., a smartwatch, a smart glass, a head mounted display (HIVID)), etc. The HIVID may be a display device which can be worn on a user's head. For example, the HIVID may be used to realize virtual reality (VR), augmented reality (AR), and mixed reality (MR). Referring to FIG. 1, the first communication device 510 and the second communication device 520 includes processors 511 and 521, memories 514 and 524, one or more Tx/Rx radio frequency (RF) modules 515 and 525, Tx processors 512 and 522, Rx processors 513 and 523, and antennas 516 and 526. A Tx/Rx module may be referred to as transceivers. Each Tx/RX module transmits a signal through the antenna 526. The processor performs the above-described functions, processes, and/or methods. The processor 521 may be related to the memory 524 for storing program codes and data. The memory may be referred to as a computer readable medium. More specifically, in the DL (communication from the first communication device to the second communication), the Tx processor 512 implements various signal processing functions of L1 layer (that is, physical layer). The Rx processor implements various signal processing functions of the L1 layer (that is, physical layer).

The UL (communication from the second communication device to the first communication device) is implemented in the first communication device 510 in a manner similar to the above-description regarding receiver functions in the second communication device 520. Each Tx/Rx module 525 may receive a signal through the antenna 526. Each Tx/Rx module provides a RF subcarrier and information to the Rx processor 523. The processor 521 may be related to the memory 524 for storing program codes and data. The memory may be referred to as a computer readable medium.

Figure 6:
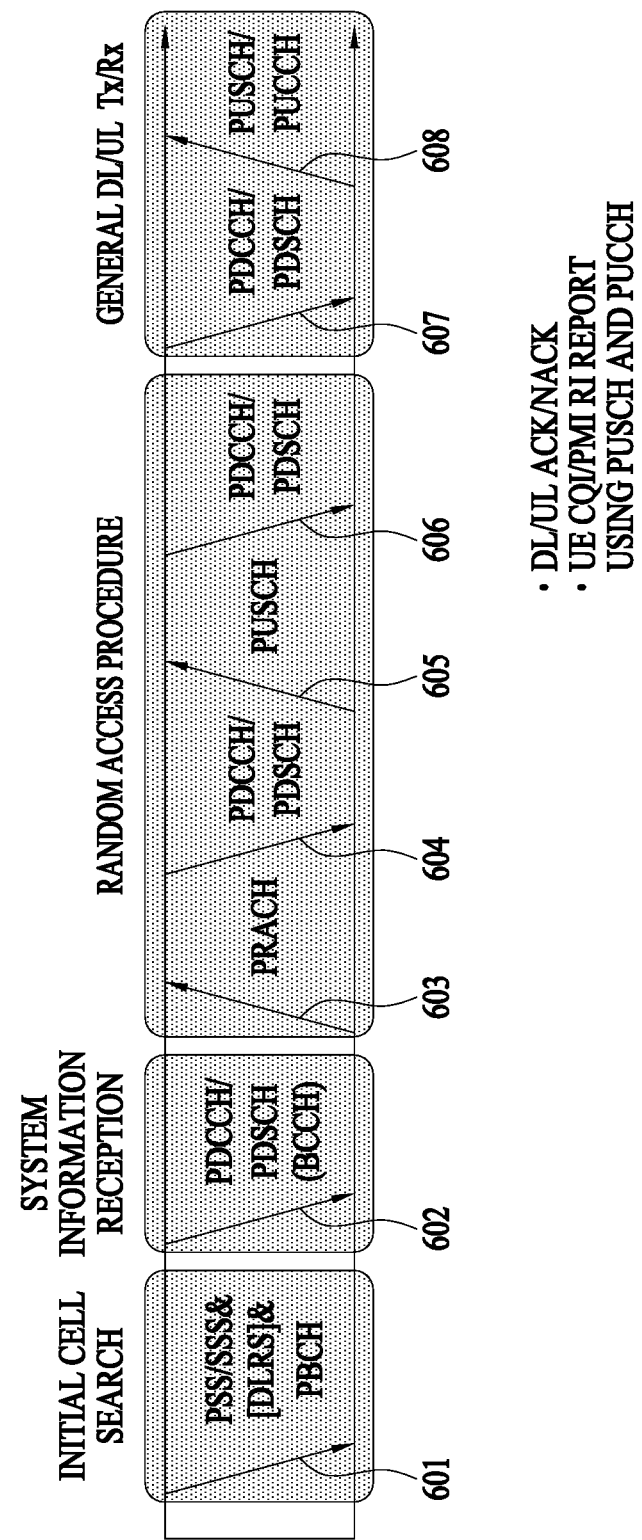
FIG. 6 is a diagram illustrating an example of a method of transmitting and receiving a signal in a wireless communication system according to an example embodiment.

FIG. 6 is a diagram illustrating a method of transmitting and receiving a signal in a wireless communication system according to an example embodiment.

FIG. 6 illustrates an example of a signal transmission/reception method in a wireless communication system.

Referring to FIG. 6, when UE is powered on or enters a new cell, the UE may perform initial cell search such as synchronization with a BS (601). To this end, the UE may receive a primary synchronization channel (P-SCH) and a secondary synchronization channel (S-SCH) from the BS to synchronize with the BS, and may acquire information such as a cell ID. In an LTE system and an NR system, the P-SCH and the S-SCH may be called a primary synchronization signal (PSS) and a secondary synchronization signal (SSS), respectively. After the initial cell search, the UE may acquire broadcast information in the cell by receiving a physical broadcast channel (PBCH) from the BS. Meanwhile, the UE may check the state of a downlink channel by receiving a downlink reference signal (DL RS) during the initial cell search. After completing the initial cell search, the UE may acquire more specific system information by receiving a physical downlink control channel (PDCCH) and a physical downlink shared channel (PDSCH) based on information on the PDCCH (602).

When the UE initially accesses the BS or when there is no radio resource for signal transmission, the UE may perform a random access procedure (RACH) for the BS (603 to 606). To this end, the UE may transmit a specific sequence as a preamble through a physical random access channel (PRACH) (603 and 605), and may receive a random access response (RAR) message for the preamble through the PDCCH and the PDSCH (604 and 606). In the case of contention-based RACH, the UE may additionally perform a contention resolution procedure.

After performing the above-described procedure, the UE may perform, as general uplink/downlink signal transmission procedures, PDCCH/PDSCH reception (607) and physical uplink shared channel (PUSCH)/physical uplink control channel (PUCCH) transmission (208). In particular, the UE may receive downlink control information (DCI) through the PDCCH. The UE may monitor a set of PDCCH candidates at monitoring occasions which are set in one or more control element sets (CORESETs) on a serving cell according to search space configurations. The set of PDCCH candidates to be monitored by the UE may be defined in terms of search space sets, and such a search space set may be a common search space set or a UE-specified search space set. The CORESET is composed of a set of (physical) resource blocks having a time duration of 1 to 3 OFDM symbols. The network may set the UE to have multiple CORESETs. The UE may monitor PDCCH candidates in one or more search space sets. Here, monitoring may refer to attempting to decode PDCCH candidate(s) in a search space. When the UE has succeeded in decoding one of the PDCCH candidates in the search space, the UE may determine that a PDCCH has been detected in a PDCCH candidate, and may perform PDSCH reception or PUSCH transmission based on DCI on the detected PDCCH. The PDCCH may be used to schedule DL transmissions through the PDSCH and UL transmissions through the PUSCH. Here, the DCI on the PDCCH may include downlink assignment (i.e., downlink (DL) grant) including at least modulation, coding format, and resource allotment information associated with a downlink shared channel or uplink (UL) grant including modulation, coding format, and resource allotment information associated with an uplink shared channel.

Referring to FIG. 6, initial access (IA) in the 5G communication system will be further described.

The UE may perform cell search, system information acquisition, beam alignment for initial access, and DL measurement based on an SSB. The SSB may be mixed with a synchronization signal/physical broadcast channel (SS/PBCH) block.

The SSB may be composed of a PSS, an SSS, and a PBCH. The SSB may be composed of four consecutive OFDM symbols, and the PSS, PBCH, SSS/PBCH, or PBCH may be transmitted for each OFDM symbol. Each of the PSS and SSS may be composed of 1 OFDM symbol and 127 subcarriers, and the PBCH may be composed of 3 OFDM symbols and 576 subcarriers.

The cell search may refer to a procedure in which the UE acquires time/frequency synchronization of a cell and detects a cell identifier (ID) (e.g., a physical layer cell ID (PCI)) of the cell. The PSS may be used to detect a cell ID in a cell ID group, and the SSS may be used to detect the cell ID group. The PBCH may be used for SSB (time) index detection and half-frame detection.

There may be 336 cell ID groups, and three cell IDs may exist for each cell ID group. Thus, a total of 1008 cell IDs may exist. Information on a cell ID group, to which a cell ID of a cell belongs, may be provided or acquired through the SSS of the cell, and information on a cell ID among cell IDs of 336 cell ID groups may be provided or acquired through the PSS.

The SSB may be transmitted periodically based on the periodicity of the SSB. An SSB basic period assumed by the UE at the time of initial cell search may be defined as 20 ms. After the cell access, the periodicity of the SSB may be set to one of 5 ms, 10 ms, 20 ms, 40 ms, 80 ms, and 160 ms by a network (e.g., BS).

Next, acquisition of system information (SI) will be described.

The SI may include a master information block (MIB) and multiple system information blocks (SIBs). The SI other than the MIB may be referred to as remaining minimum system Information (RMSI). The MIB may include information/parameters for monitoring the PDCCH which schedules the PDSCH carrying system information block 1 (SIB1), and may be transmitted by the BS through the PBCH of the SSB. The SIB1 may include information on the availability and scheduling (e.g., a transmission period and an SI-window size) of the remaining SIBs (hereinafter, SIBx (x being an integer of 2 or more)). The SIBx may be included in an SI message and may be transmitted through the PDSCH. Each SI message may be transmitted within a time window (i.e., an SI-window) which periodically occurs.

Referring to FIG. 6, random access (RA) in the 5G communication system will be further described.

The random access may be used for various purposes. For example, the random access may be used for network initial access, handover, and UE-triggered UL data transmission. The UE may acquire UL synchronization and UL transmission resources through the random access. The random access may be classified into contention-based random access and contention-free random access. A detailed procedure for the contention-based random access is as follows.

The UE may transmit a random access preamble as an Msg1 of the random access in UL through the PRACH. Random access preamble sequences having two different lengths may be supported. A Long sequence length of 839 may be applied to a subcarrier spacing of 1.25 kHz or 5 kHz, and a short sequence length of 139 may be applied to a subcarrier spacing of 15 kHz, 30 kHz, 60 kHz, or 120 kHz.

When the BS receives the random access preamble from the UE, the BS may transmit a random access response (RAR) message (Msg2) to the UE. The PDCCH which schedules the PDSCH including the RAR may be transmitted by being CRC-masked with a random access (RA) radio network temporary identifier (RNTI) (RA-RNTI). The UE, which has detected the PDCCH masked with the RA-RNTI, may receive the RAR from the PDSCH scheduled by the DCI carried by the PDCCH. The UE may check whether random access response information for the preamble transmitted by the UE, i.e., Msg1, is in the RAR. Whether the random access response information for the Msg1 transmitted by the UE is in the RAR may be determined by whether there is a random access preamble ID for the preamble transmitted by the UE. When there is no response to the Msg1, the UE may retransmit the RACH preamble a predetermined number of times while performing power ramping. The UE may calculate PRACH transmission power for retransmission of the preamble based on the most recent path loss and a power ramping counter.

The UE may transmit, as an Msg3 of the random access, UL transmission through the uplink shared channel based on the random access response information. The Msg3 may include an RRC connection request and an UE identifier. As a response to the Msg3, the network may transmit an Msg4, which may be treated as a contention resolution message in DL. By receiving the Msg4, the UE may enter an RRC-connected state.

Figure 7:
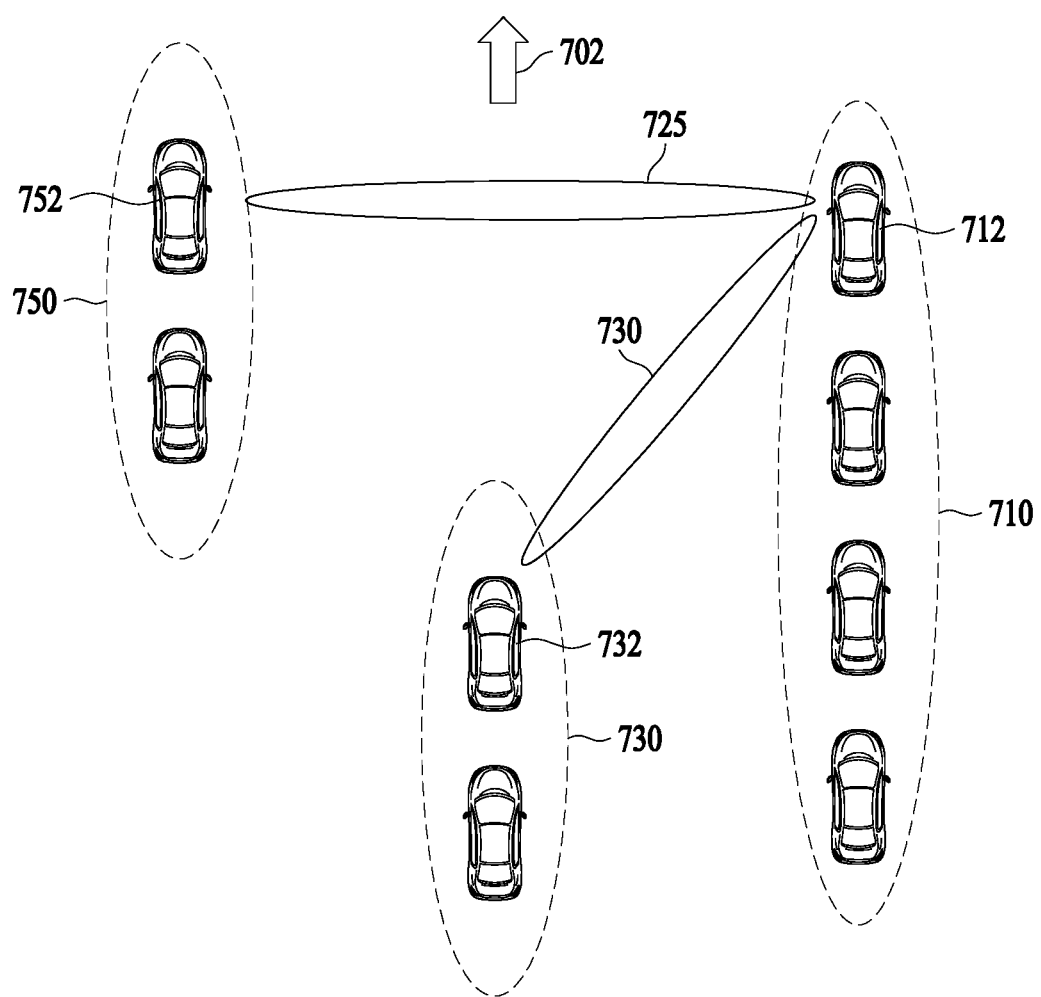
FIG. 7 is a diagram illustrating communication between platooning vehicles according to an embodiment of the present disclosure.

FIG. 7 is a diagram illustrating communication between platooning vehicles according to an embodiment of the present disclosure.

Referring to FIG. 7, there is illustrated a conceptual shape of a signal that is used for communication between a first platoon 710, a second platoon 730, and a third platoon 750 each driving in a first direction 702.

The first platoon 710 may include a first leader vehicle 712 and three following vehicles. The second platoon 730 may include a second leader vehicle 732 and one following vehicle. The third platoon 750 may include a third leader vehicle 752 and one following vehicle.

The respective platooning vehicles may exchange information regarding positions of the respective platoons, driving speeds, driving directions, predicted routes, and vehicles included in the platoons. In addition, information regarding a different platoon may be acquired through a sensor provided in a vehicle included in each platoon.

The first leader vehicle 712 may transmit a signal to another platoon, and the signal may be transmitted to the leader vehicle 732 or 752 of the corresponding platoon. In an embodiment, the first leader vehicle 712 may identify a position of a leader vehicle of each platoon based on information acquired from another platoon, adjust antenna heading in a direction corresponding to the position of the leader vehicle, and transmit information to the leader vehicles in a focused manner through beamforming in operations 725 and 730. In an embodiment, beamforming may be performed based on at least one of analog beamforming and digital beamforming. As beamforming is performed, it is possible to effectively perform signal transmission on a specific area.

For example, the first leader vehicle 712 may identify positions of the second leader vehicle 732 and the third leader vehicle 752 based on acquired information regarding the second platoon 730 and the third platoon 750. Based on information on the identified positions, the first leader vehicle 712 may perform at least one of heading adjustment or beamforming in order to transmit information to a target platoon for signal transmission. Hereinafter, the target platoon for signal transmission is referred to as a "target platoon."

As such, by controlling heading in a corresponding direction and performing beamforming, it is possible to transmit information more effectively. Meanwhile, an embodiment has been described such that leader vehicles of platoons communicate each other and the leader vehicles are vehicles positioned at the front of the respective platoons. However, at least one vehicle in a platoon may communicate with a vehicle in another platoon, and a position of a leader vehicle in a platoon may be set variously. In addition, information regarding a position of a platooning vehicle may be included in information that is exchanged between platoons. Based on such information, it is possible to identify a position of a leader vehicle of another platoon.

Meanwhile, in an embodiment, in order to perform signal transmission through beamforming, a leader vehicle may perform signal transmission using a beamforming vector corresponding to a transmission signal. In an embodiment, an effective transmission distance of the signal may vary according to application of the beamforming vector. When the beamforming vector is determined to form a beam having a narrower width, the effective transmission distance of the signal may increase but a width within which a target signal is received effectively may decrease.

In addition, a platoon mentioned through the entire embodiment may include at least one vehicle.

In addition, in an embodiment, driving information of a platoon including at least one following vehicle may be determined based on at least one of driving information of a leader vehicle or driving information of a following vehicle. Even when the driving information of the following vehicle is determined by the leader vehicle, traveling information of the corresponding platoon may be identified according to information on actual traveling of the following vehicle.

Figure 8:
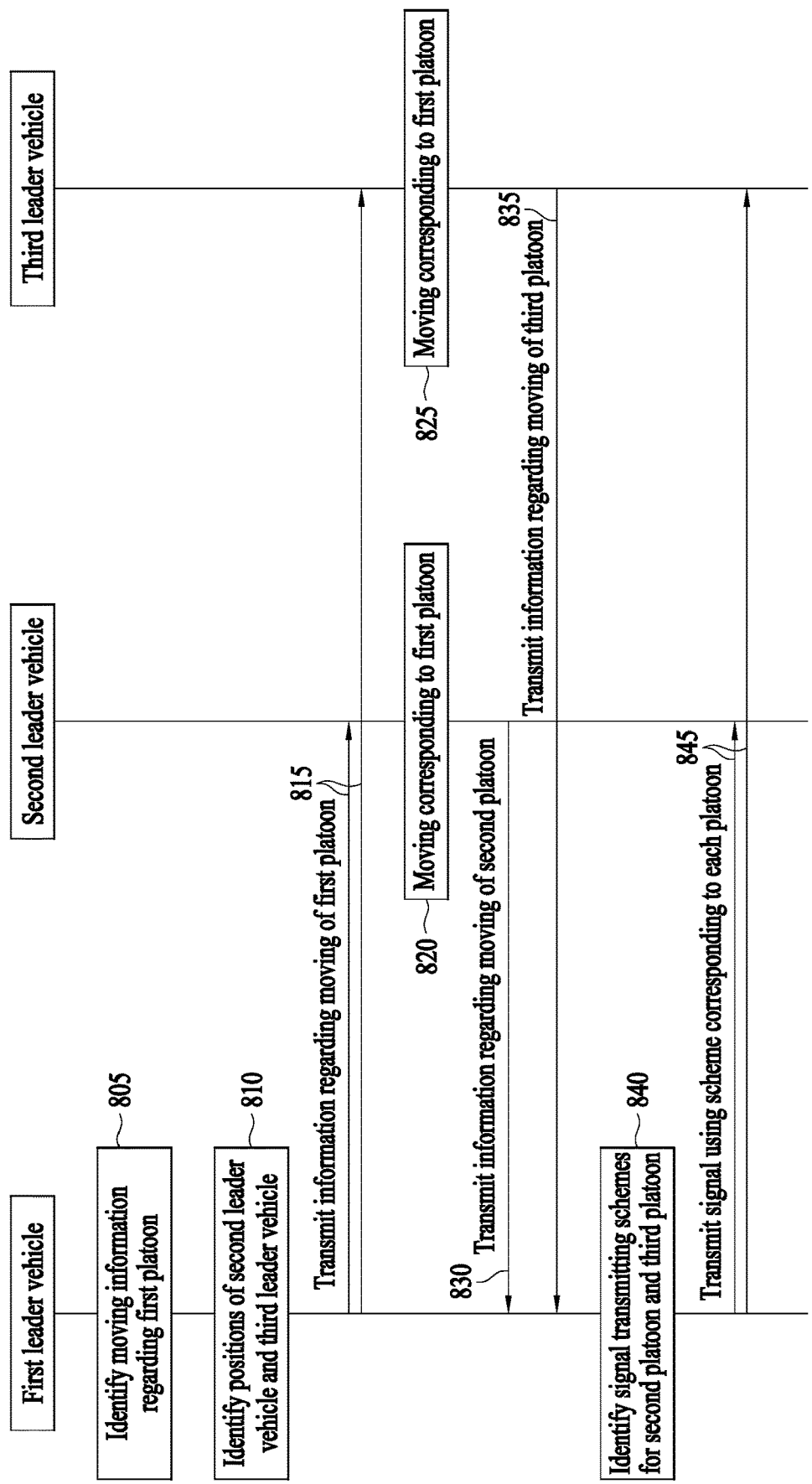
FIG. 8 is a diagram illustrating an operation of each platoon and transmitted information during communication between platooning vehicles according to an embodiment of the present disclosure.

FIG. 8 is a diagram illustrating an operation of each platoon and transmitted information during communication between platooning vehicles according to an embodiment of the present disclosure.

Referring to FIG. 8, leader vehicles of first to third platoons may perform communication. A first leader vehicle, a second leader vehicle, and a third leader vehicle may correspond to leader vehicles of the first, second, and third platoons, respectively. In an embodiment, each platoon may acquire traveling related information of other platoons.

In operation 805, the first leader vehicle may identify moving information regarding a first platoon to which the first leader vehicle belongs. More specifically, the first leader vehicle may identify an input regarding driving, and identify moving information corresponding to the input. For example, based on information on steering of a driving wheel, turning on/off a turn signal lamp, and acquisition of predicted route information, the first leader vehicle may identify information regarding moving of the first platoon.

In operation 810, the first leader vehicle may identify positions of the second leader vehicle and the third leader vehicle. In an embodiment, the first leader vehicle may identify a position of other leader vehicle based on at least one of previously acquired information regarding the other platoon or information acquired by a vehicle belonging to the first platoon.

In operation 815, based on at least part of the identified information, the first leader vehicle may transmit the information regarding the moving of the first platoon to the second leader vehicle and the third leader vehicle. The first leader vehicle may transmit the information regarding the moving of the first platoon by a transmitting scheme corresponding to an identified position of each of the respective other leader vehicles For example, the first leader vehicle may transmit the information regarding the moving of the first platoon to the second leader vehicle by controlling heading and beamforming to correspond to the position of the second leader vehicle, and may transmit a signal to the third leader vehicle in a similar manner. In an embodiment, the order of transmitting a signal may be determined based on a distance between the first platoon and each of the respective other platoons. If the second platoon is positioned adjacent to the first platoon, the first leader vehicle may transmit the information regarding the moving of the first platoon to the second leader vehicle and then transmit the corresponding information to the third leader vehicle. In addition, in an embodiment, the information regarding the moving of the first platoon may be transmitted first to a platoon which needs to move first to correspond to the moving of the first platoon.

In operation 820, when the second platoon needs to move based on the received information to correspond to the moving of the first platoon, the second leader vehicle may perform moving corresponding to the moving of the first platoon.

In operation 825, when the third platoon needs to move based on the received information to correspond to the moving of the first platoon, the third leader vehicle may perform moving corresponding to the moving of the first platoon.

In operation 830, the second leader vehicle may transmit information regarding moving of the second platoon to the first leader vehicle. The information regarding the moving of the second platoon may include at least one of information regarding moving performed by the second platoon based on previously received information or information regarding whether the moving is completed. In this case, a vehicle belonging to the second platoon may transmit information by applying heading and beamforming to correspond to a position of a vehicle belonging to the first platoon.

In operation 835, the third leader vehicle may transmit information regarding moving of the third platoon to the first leader vehicle. The information regarding the moving of the third platoon may include at least one of information regarding moving performed by the third platoon based on previously received information or information regarding whether the moving is completed. In this case, a vehicle belonging to the third platoon may transmit information by applying heading and beamforming to correspond to a position of a vehicle belonging to the first platoon.

In operation 840, the first leader vehicle may identify moved positions of the second leader vehicle and the third leader vehicle based on the received information, and may identify signal transmitting schemes for the second platoon and the third platoon. In an embodiment, a signal transmitting scheme may include information regarding at least one of antenna heading, a beamforming scheme, or transmit power.

In operation 845, based on the information identified in the previous operation, the first leader vehicle may transmit a signal in a signal transmitting scheme corresponding to each platoon.

As such, information resulting from moving of a vehicle is exchanged between platoons and communication is performed by modifying a signal transmitting scheme based on the exchanged information, and accordingly, it is possible to transmit information more effectively.

Figure 9:
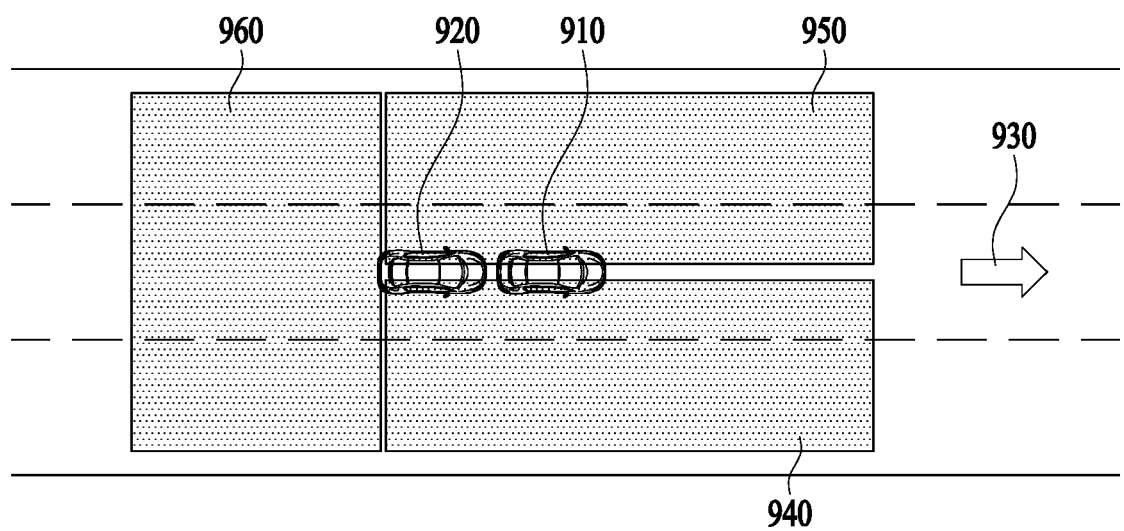
FIG. 9 is a diagram illustrating a signal transmission required area according to an embodiment of the present disclosure.

FIG. 9 is a diagram illustrating a signal transmission required area according to an embodiment of the present disclosure.

Referring to FIG. 9, there are illustrated driving platooning vehicles, and a transmission required area associated with signal transmission according to positions of the platooning vehicles.

In an embodiment, a leader vehicle 910 and a following vehicle 920 may drive in a first direction 930.

In this case, for communication with other vehicle, it may be necessary to differentiate a signal transmission required area. The leader vehicle 910 may transmit a signal by controlling heading, beamforming, and transmit power based on the differentiated area. In an embodiment, in the case of beamforming, a width of a signal to be transmitted may be controlled according to the beamforming and it may be possible to more effectively transmit a signal for a longer distance according to implementation of the beamforming.

In an embodiment, the leader vehicle 910 may differentiate a first area 920, a second area 950, and a third area 960, and may determine a signal transmitting scheme corresponding to each of the areas. In an embodiment, the leader vehicle 910 may adaptively change each area depending on how an adjacent vehicle is positioned, and may determine an appropriate signal transmitting scheme.

In addition, in an embodiment, when it is necessary to transmit a signal to the third area 960, the leader vehicle 910 may control the following vehicle 920 to transmit the signal to the third area 960, because it is more effective to transmit the signal to the third area 960 from the following vehicle 920 than from the leader vehicle 910.

As such, areas may be differentiated and signals may be transmitted using signal transmitting schemes corresponding to the respective areas. The signals may be effectively transmitted to the various areas through support from another vehicle belonging to a platoon.

Figure 10:
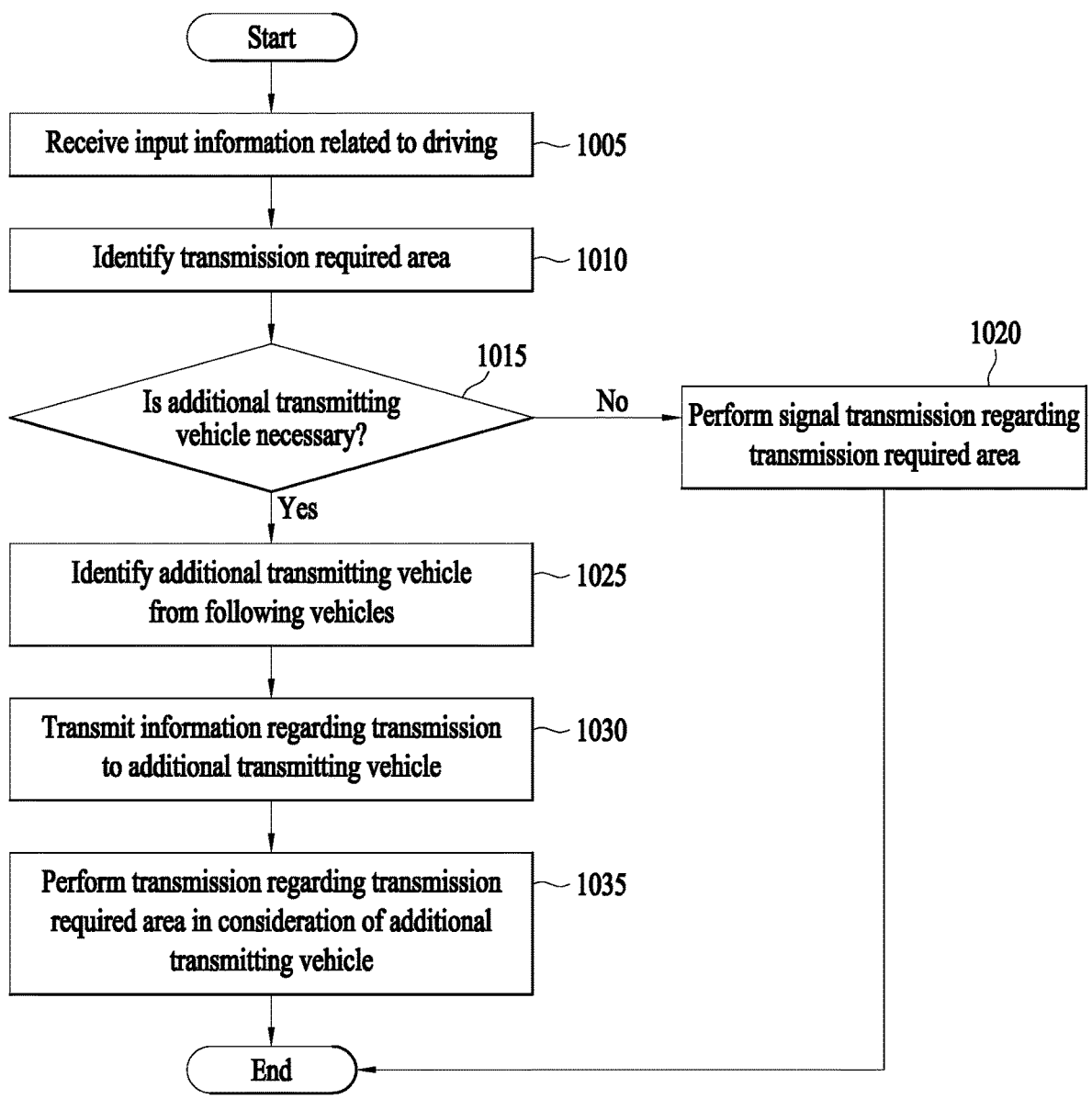
FIG. 10 is a diagram illustrating a method for performing signal transmission on a signal transmission required area according to an embodiment of the present disclosure.

FIG. 10 is a diagram illustrating a method for performing signal transmission on a signal transmission required area according to an embodiment of the present disclosure.

Referring to FIG. 10, when traveling-related input information is received from a leader vehicle, an operation for identifying a corresponding signal transmission required area and effectively transmitting a signal to the signal transmission required area is performed.

In operation 1005, the leader vehicle may receive the input information related to traveling. In an embodiment, the input information related to traveling may include at least one of steering of a driving wheel, an acceleration input, a deceleration input, turning on/off of a turn signal lamp, or predicted route information. In addition, the input information related to traveling may include information regarding moving of a vehicle.

In operation 1010, the leader vehicle may identify a signal transmission required area based on the received information. For example, based on the input information related to traveling, the leader vehicle may identify an area corresponding to a direction of a platoon to which the leader vehicle belongs as the signal transmission required area. In addition, based on at least one of a speed of the platoon to which the leader vehicle belongs or a speed of an adjacent platoon, the leader vehicle may identify the signal transmission required area.

In operation 1015, the leader vehicle may identify whether any additional transmitting vehicle is necessary to transmit a signal to the identified signal transmission required area. Hereinafter, a transmitting vehicle to transmit a signal is referred to as a "transmitting vehicle".

When any additional transmitting vehicle is not necessary and the leader vehicle is able to transmit a signal, the leader vehicle may transmit a signal including information regarding moving of the platoon to which the leader vehicle belongs to the signal transmission required area in operation 1020.

When any additional transmitting vehicle is necessary, the leader vehicle may identify an additional transmitting vehicle from following vehicles belonging to the platoon to which the leader vehicle belongs in operation 1025. For example, when a signal needs to be transmitted to a rear side of the corresponding platoon and the leader vehicle is positioned at the front of the corresponding platoon, the leader vehicle may identify at least one of vehicles positioned at the rear of the corresponding platoon as an additional transmitting vehicle.

Meanwhile, in an embodiment, when one or more transmitting vehicle is necessary for signal transmission to the signal transmission required area, the leader vehicle may request signal transmission to the corresponding area from a plurality of vehicles. In this case, the leader vehicle may divide the signal transmission required area into sub-areas and may designate a vehicle responsible for each sub-area.

In operation 1030, the leader vehicle may transmit information for signal transmission to the additional transmitting vehicle. For example, the information for signal transmission may include at least one of traveling related information, transmission area information, heading information for transmission, beamforming information, or transmit power information.

In operation 1035, based on at least one of previously acquired information or received information, at least one of the leader vehicle or the additional transmitting vehicle may perform signal transmission on the signal transmission required area.

As such, signal transmission is performed in a manner in which a signal transmission required area is identified based on input information related to traveling and a transmitting vehicle for the signal transmission required area is identified. Accordingly, it is possible to perform signal transmission intensively on the signal transmission required area. In addition, even when the signal transmission required area is wide, it is possible to effectively perform signal transmission by a plurality of transmitting vehicles.

FIG. 11 is a diagram illustrating a signal transmitting scheme taking into consideration a speed of a vehicle and information regarding other vehicles according to an embodiment of the present disclosure.

Referring to FIG. 11, a platoon including a leader vehicle 1110 and following vehicles 1112 and 1114 drives, and other vehicles 1120 may be positioned ahead in a driving direction.

In reference numeral 1100, the platoon is driving at a speed corresponding to the other vehicles 1120. In this case, a beamforming scheme may be determined so that a signal is transmitted to a vehicle adjacent to the platoon from among the vehicles positioned ahead, as indicated by reference numeral 1130.

Thereafter, if the platoon drives at a high speed, it is necessary to transmit a signal to vehicles positioned at the front among the other vehicles 1120. Accordingly a signal transmitting scheme may be changed.

Through reference numeral 1130, the vehicle adjacent to the platoon among the other vehicles may acquire information regarding moving of the platoon. In the case indicated by reference numeral 1150, for high speed driving, the platoon may change the signal transmitting scheme to reduce a width of a transmitted beam and transmit the signal farther away, as indicated by reference numeral 1180.

In addition, in an embodiment, when the other vehicles 1120 positioned ahead block a route of the platoon, the platoon may keep performing signal transmission, as indicated by reference numeral 1130. As the route of the platoon is secured, the platoon may control at least one of a beamforming scheme or transmit power to transmit a signal farther away.

Meanwhile, a signal may be transmitted in a different way in response to a change in a driving speed of the platoon, and this may be the case even when transmitting a signal in a backward direction of travel as well as in a forward direction of travel. In order to transmit a signal in the backward direction of travel, the following vehicle 1114 may transmit a signal. When it is necessary to transmit a signal even farther away in response to a change in a speed, the following vehicle 1114 may transmit the signal in the backward direction of travel by employing a beamforming scheme as indicated by reference numeral 1180.

Figure 12:
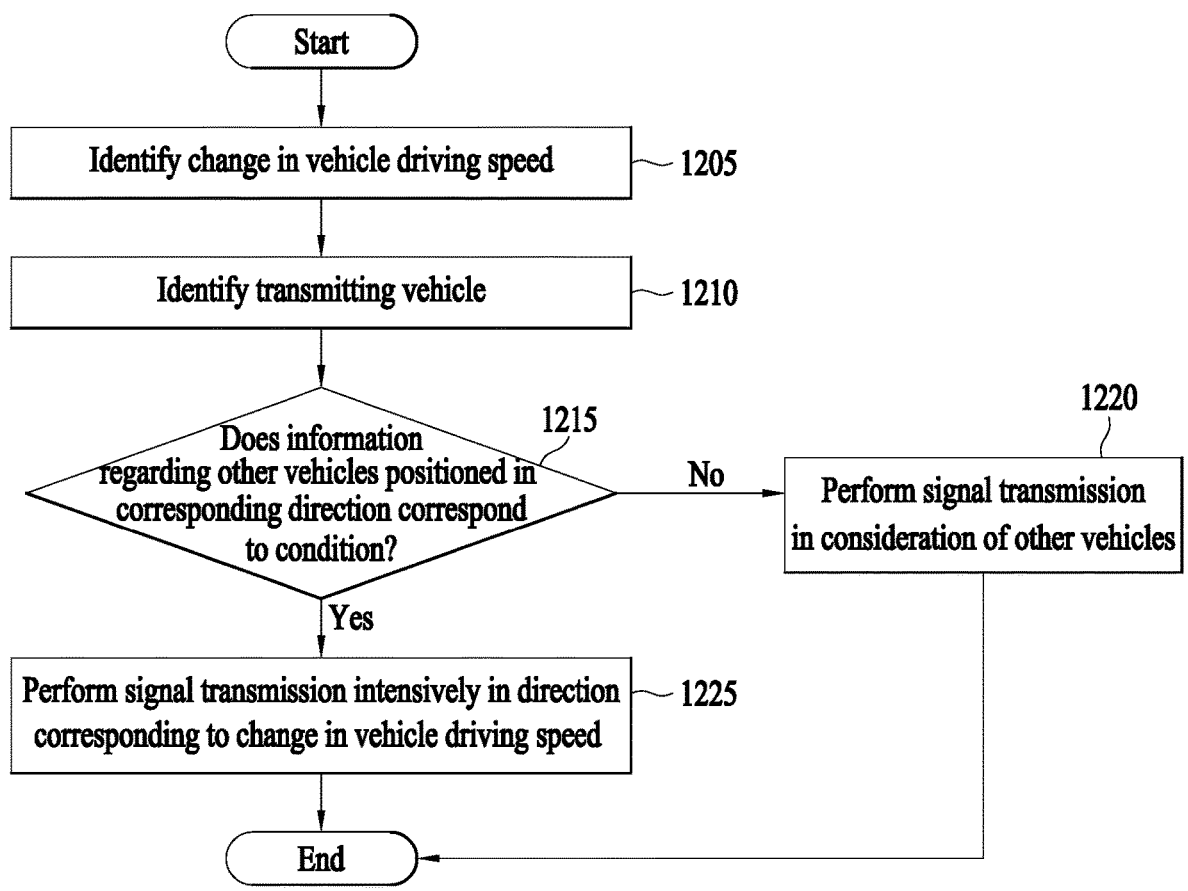
FIG. 12 is a diagram illustrating a method for determining a signal transmitting scheme based on a speed of a vehicle and information regarding other vehicle according to an embodiment of the present disclosure.

FIG. 12 is a diagram illustrating a method for determining a signal transmitting scheme based on a speed of a vehicle and information regarding other vehicle according to an embodiment of the present disclosure.

Referring to FIG. 12, a method for adaptively changing a signal transmitting scheme according to a change in a driving speed of a vehicle that performs vehicle platooning.

In operation 1205, a leader vehicle may identify a change in a driving speed associated with a platoon. The leader vehicle may predict the change in the driving speed based on at least one of an acceleration input, a deceleration input, a traffic condition, or route information. Based on the change in the driving speed, the leader vehicle may identify a signal transmission required area.

For example, when a platooning vehicle increases in speed, it may be necessary to transmit a signal farther away in a forward direction of travel. When a platooning vehicle decreases in speed, it may be necessary to transmit a signal intensively in a backward direction of travel of the vehicle.

In operation 1210, the leader vehicle may identify a transmitting vehicle which is to transmit a signal to a signal transmission required area. For example, in the case of transmitting a signal in the forward direction of travel, the leader vehicle may transmit the signal, and, in the case of transmitting a signal in the backward direction of travel, a following vehicle positioned at the rear of the platoon may transmit the signal.

In operation 1215, the leader vehicle may identify information regarding other vehicles positioned in a direction corresponding to signal transmission, and identify whether the information regarding the other vehicles corresponds to a predetermined condition. In an embodiment, the predetermined condition may include the case where the other vehicles are informed of information regarding a route required to be secured in accordance with a change in a speed of the corresponding platoon. In addition, the predetermined condition may include the case where the route required to be secured in accordance with a change in a speed of the corresponding platoon has been secured.

When the information regarding the other vehicles does not correspond to the predetermined condition, the transmitting vehicle may perform signal transmission in consideration of other vehicle in operation 1220. For example, the transmitting vehicle may perform signal transmission to transmit information to the other vehicle until a route of travel of the platoon is secured.

When the information regarding the other vehicles corresponds to the predetermined condition, the transmitting vehicle may perform signal transmission intensively in a direction corresponding to a change in a speed of platooning vehicles in operation 1225. For example, when vehicles belonging to a platoon perform acceleration, at least one of a beamforming scheme or transmit power may be controlled so as to transmit information to a vehicle positioned further ahead.

As such, as a signal is transmitted intensively in a direction corresponding to the change in speeds of the other vehicles, it is possible to effectively exchange information with the other vehicles.

Figure 13:
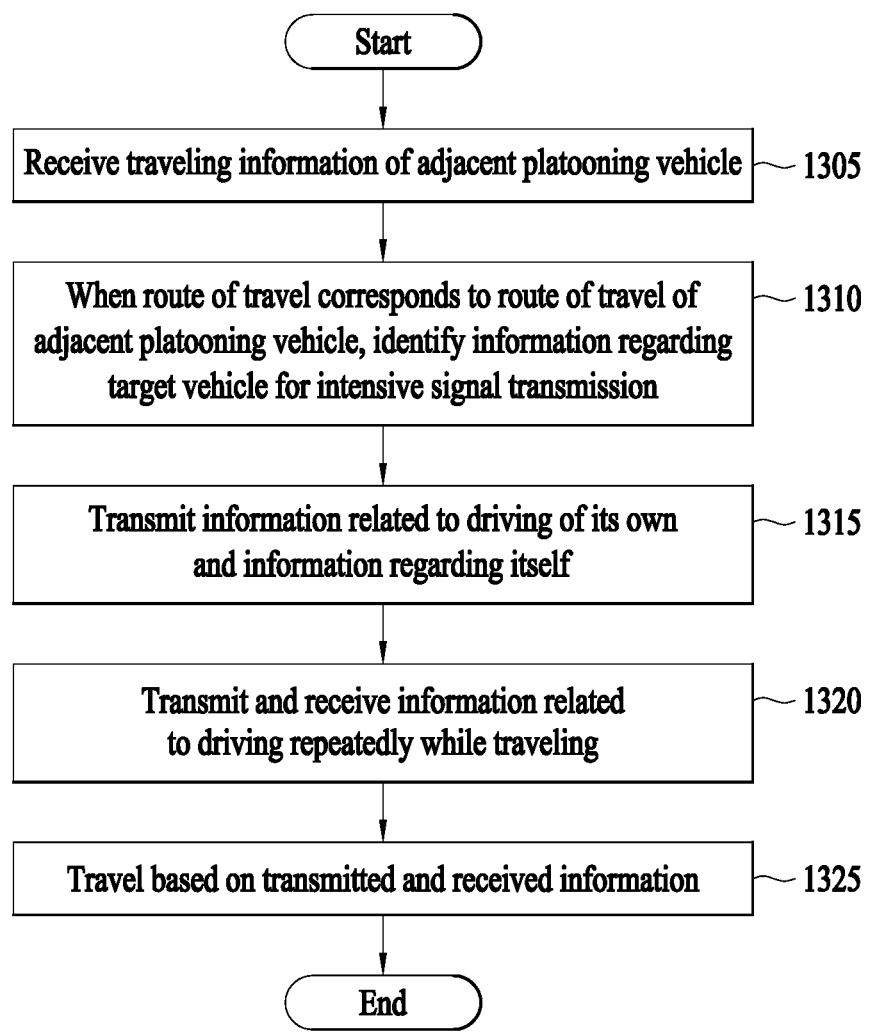
FIG. 13 is a diagram illustrating an information exchanging method for exchanging traveling information between platooning vehicles according to an embodiment of the present disclosure.

FIG. 13 is a diagram illustrating an information exchanging method for exchanging traveling information between platooning vehicles according to an embodiment of the present disclosure.

Referring to FIG. 13, there is illustrated a method for repeatedly exchanging information between platooning vehicles when driving along a corresponding route between the platooning vehicles.

In operation 1305, a leader vehicle may receive traveling related information of an adjacent platooning vehicle. In an embodiment, input information related to traveling of the adjacent platooning vehicle may include at least one of steering of a driving wheel, an acceleration input, a deceleration input, turning on/off of a turn signal lamp, or predicted route information. Hereinafter, a platoon to which the leader vehicle belongs is referred to as a "host platoon". In addition, the input information related to traveling of the adjacent platooning vehicle may include information regarding moving of the corresponding vehicle.

In operation 1310, when a route of travel of an adjacent platoon corresponds to a route of travel of the host platoon to which the leader vehicle belongs, the leader vehicle of the host platoon may set the adjacent platoon as a target platoon for intensive signal transmission and identify information regarding the adjacent platoon. For example, the leader vehicle of the host platoon may identify a position of a leader vehicle of the adjacent platoon and control antenna heading, beamforming, and transmit power so as to smoothly communicate with the leader vehicle of the adjacent platoon.

In operation 1315, the leader vehicle of the host platoon may transmit, to the leader vehicle of the adjacent platoon, at least one of information related to driving of the host platoon and information regarding the host platoon.

In operation 1320, the leader vehicle of the host platoon may, while driving, transmit and receive information to and from the leader vehicle of the adjacent platoon. For example, when the two platoons travel while making a turn in adjacent lanes in the same direction, the two platoons may exchange information regarding a turning angle and information a lane to enter after turning.

In operation 1325, the leader vehicle of the host platoon may perform driving in association with a platooning vehicle based on at least one of transmitted information or received information. As such, as the leader vehicle drives based on exchanged information, it is possible to avoid a collision with an adjacent platoon. In addition, as a platoon driving along a corresponding route is set as a target for intensive signal transmission and a signal transmitting scheme is changed according to the target of intensive signal transmission, it is possible to transmit and receive information more effectively.

Figure 14:
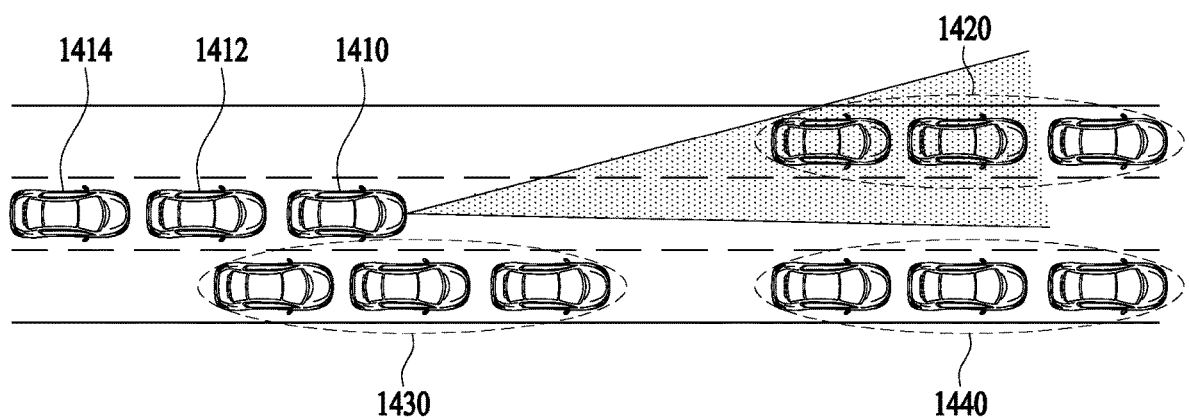
FIG. 14 is a diagram illustrating how to select a platoon, to which a signal is to be transmitted first, and transmit a signal to the selected platoon according to an embodiment of the present disclosure.

FIG. 14 is a diagram illustrating how to select a platoon, to which a signal is to be transmitted first, and transmit a signal to the selected platoon according to an embodiment of the present disclosure.

Referring to FIG. 14, there is illustrated a method in which a vehicle driving in a platoon selects other platoon to which a signal is to be transmitted first.

A first platoon may include a leader vehicle 1410 and following vehicles 1412 and 1414, and the first platoon is driving in the middle lane. A second platoon 1420, a third platoon 1430, and a fourth platoon 1440 are driving together with the first platoon.

The respective platoons may exchange traveling related information. In doing so, the leader vehicle 1410 may identify traveling related information of other platoons.

In an embodiment, the first platoon and the fourth platoon 1440 are driving at high speeds, whereas the second platoon 1420 and the third platoon 1430 are driving at low speeds.

In this case, the leader vehicle 1410 may determine that the third platoon 1430 is about to be overtaken soon and that the fourth platoon 1440 is driving at a corresponding speed and thus less likely to drive in the vicinity of the leader vehicle 1410. Therefore, the leader vehicle 1410 may select the second platoon 1420, which is likely to approach soon to the vicinity of the leader vehicle 1410 in consideration of a difference in driving speeds between the first platoon and the second platoon 1420, as a highest priority target platoon. Accordingly, the leader vehicle 1410 may first transmit a signal in a direction corresponding to the second platoon 1420. In addition, the leader vehicle 1410 may transmit a signal to an already overtaken platoon with a lowest priority. Then, the leader vehicle 1410 may perform platooning by determining a next platoon to which a signal is to be transmitted.

In addition, in an embodiment, in a part of an area for transmitting a signal to a highest-priority platoon, the leader vehicle 1410 may transmit a signal to another platoon. In the corresponding part of the area, the leader vehicle 1410 may transmit a signal to the highest-priority platoon for the longest period of time and transmit signals to remaining vehicles for a shorter period of time compared to the highest priority vehicle. In addition, a signal is transmitted to the highest priority platoon through beamforming, and signals are transmitted to other platoons through omnidirectional transmission.

As such, when the host platoon drives at a high speed, it is necessary to transmit a message to another platoon positioned farther ahead. In this case, a signal transmitting scheme may be controlled so as to first transmit a signal to a vehicle likely to be overtaken soon from among platoons ahead in consideration of a difference in relative speeds. As such, as a signal is transmitted intensively by controlling a signal transmitting scheme, it is possible to overtake other vehicles more safely.

Figure 15:
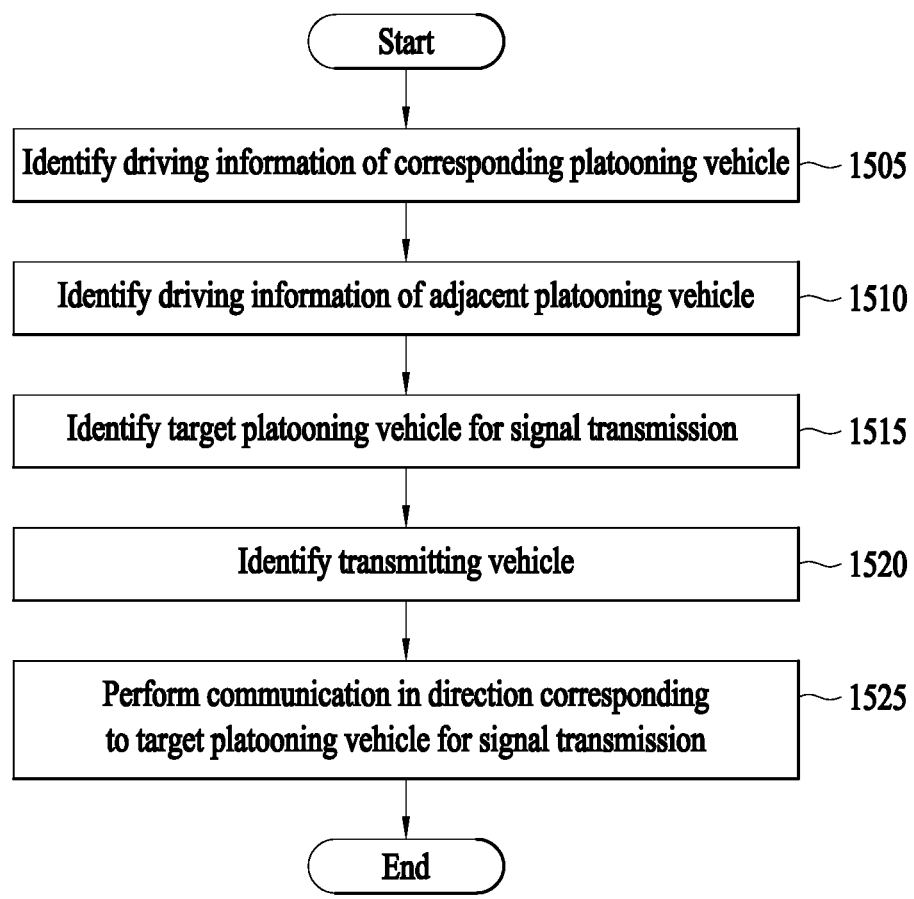
FIG. 15 is a diagram illustrating a method for selecting a platooning vehicle to which a signal is to be transmitted first based on driving information of other platooning vehicles according to an embodiment of the present disclosure.

FIG. 15 is a diagram illustrating a method for selecting a platooning vehicle to which a signal is to be transmitted first based on driving information of other platooning vehicles according to an embodiment of the present disclosure.

Referring to FIG. 15, there is illustrated a method in which a platooning vehicle driving in the vicinity of other vehicles selects other platoon to which a signal is to be transmitted first.

In operation 1505, a leader vehicle may identify driving information of a platoon to which the leader vehicle belongs. Hereinafter, the platoon to which the leader vehicle belongs is referred to as a "host platoon." In an embodiment, the driving information may include at least one of speed information, steering of a driving wheel, an acceleration input, a deceleration input, turning on/off of a turn signal lamp, or predicted route information. In addition, the driving information may include information regarding moving of a vehicle.

In operation 1510, the leader vehicle may identify driving information of adjacent platoons. In an embodiment, the driving information may include at least one of speed information or predicted route information. The leader vehicle may receive the information from the adjacent platoons or may acquire the information based on a value measured using a sensor.

In operation 1515, the leader vehicle may identify a target platoon for signal transmission based on at least a part of the identified information. In an embodiment, based on the driving information of the host platoon and the driving information of the adjacent platoons, the leader vehicle may identify a platoon likely to meet first in the vicinity of the host platoon as a target platoon. For example, the leader vehicle may identify a platoon likely to be first overtaken upon acceleration of the host platoon as a target platoon, and the leader vehicle may identify a platoon likely to first overtake the host platoon upon deceleration of the host platoon as a target platoon.

In operation 1520, the leader vehicle may identify a transmitting vehicle for transmitting a signal from the host platoon to the identified target platoon. For example, the transmitting vehicle may include a vehicle most adjacent to the target platoon from the host platoon.

In operation 1525, the transmitting vehicle may transmit a signal in a direction corresponding to the target platoon. The transmitting vehicle may transmit a signal by controlling one of antenna heading, beamforming, and transmit power to correspond to the target platoon.

As such, by selecting a target platoon, determining a transmitting vehicle, and performing signal transmission intensively on the target platoon, it is possible to perform effective signal transmission.

Figure 16:
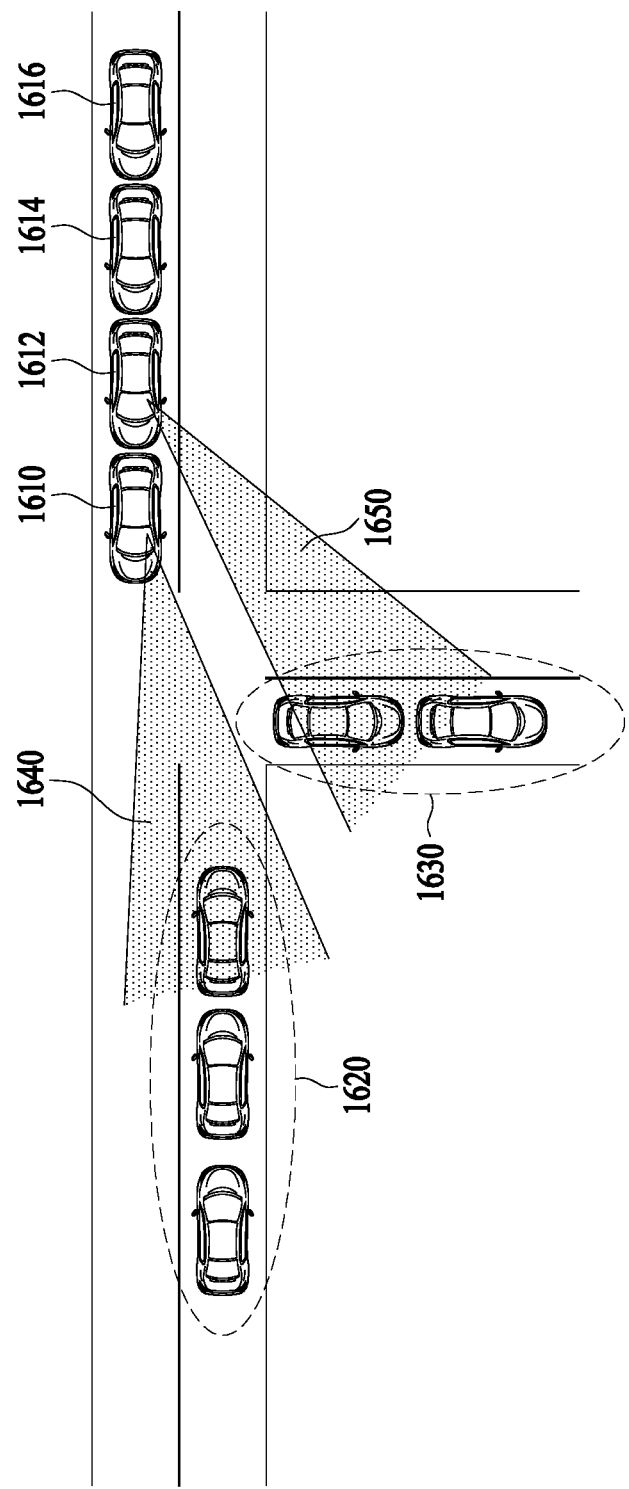
FIG. 16 is a diagram illustrating an example in which signals are transmitted to a plurality of target platoons according to an embodiment of the present disclosure.

FIG. 16 is a diagram illustrating an example in which signals are transmitted to a plurality of target platoons according to an embodiment of the present disclosure.

Referring to FIG. 16, a first platoon may include a leader vehicle 1610 and following vehicles 1612, 1614, and 1616. A second platoon 1620 and a third platoon 1630 may be positioned at an intersection.

In an embodiment, the leader vehicle 1610 may identify a platoon to which a signal is to be transmitted, and the leader vehicle 1610 may exchange information related to driving with the identified platoon.

In order to transmit signals to areas corresponding to the respective other platoons, the leader vehicle 1610 may share a signal transmitting role with another vehicle in the first platoon to which the leader vehicle 1610 belongs. The leader vehicle 1610 may identify target platoons of signal transmission, and determine transmitting vehicles based on the positions of the target platoons and the positions of other vehicles belonging to the host platoon. For example, a vehicle most suitable for transmitting a signal to each target platoon may be determined as a transmitting vehicle. In another example, a transmitting vehicle may be assigned to satisfy a reference signal transmission quality for each target platoon.

In an embodiment, as the leader vehicle 1610 transmits a signal 1640 to the second platoon 1620 and the following vehicle 1612 transmits a signal 1650 to the third platoon 1630, optimal signal transmission may be performed. In order to allow the following vehicle 1612 to transmit a signal, the leader vehicle 1610 may transmit information to be sent and information regarding a target platoon to the following vehicle 1612.

As such, even when there is a plurality of target platoons, transmitting vehicles are assigned for the respective target platoons, and therefore, optimal signal transmission may be performed.

Figure 17:
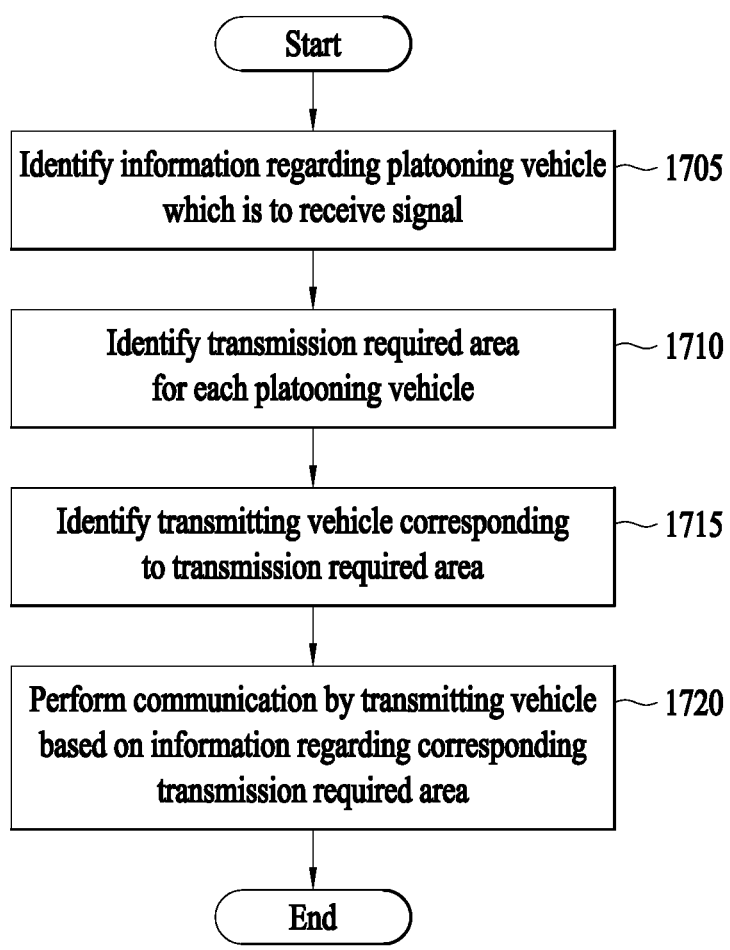
FIG. 17 is a diagram illustrating a method for transmitting signals to a plurality of target platoons according to an embodiment of the present disclosure.

FIG. 17 is a diagram illustrating a method for transmitting signals to a plurality of target platoons according to an embodiment of the present disclosure.

Referring to FIG. 17, there is illustrated a method in which a leader vehicle in a platoon performs signal transmission by identifying transmission areas for other platoons and selecting transmitting vehicles to transmit signals to the respective transmission areas.

In operation 1705, the leader vehicle may identify information regarding a target platoon which is to receive a signal. For example, the target platoon may include the platoon to which the leader vehicle belongs, and platoons adjacent to the platoon to which the leader vehicle belongs. Hereinafter, the platoon to which the leader vehicle belongs is referred to as a "host platoon." In addition, when the leader vehicle is positioned adjacent to an intersection, the target platoon may include other platoons adjacent to the intersection.

In operation 1710, the leader vehicle may identify signal transmission required areas corresponding to the respective target platoons in order to transmit signals to the respective target platoons. For example, the leader vehicle of the host platoon may identify a position of a leader vehicle of a target platoon, and identify an area where the leader vehicle of the target platoon is positioned as a signal transmission required area.

In operation 1715, the leader vehicle of the host platoon may determine a transmitting vehicle for transmitting a signal to a transmission area from among other vehicles in the host platoon to which the leader vehicle belongs. In an embodiment, a vehicle positioned most adjacent to a corresponding transmission area may be determined as a vehicle for transmitting a signal to the corresponding transmission area. Hereinafter, the vehicle to transmit a signal is referred to as a "transmitting vehicle." In addition, in an embodiment, a vehicle capable of satisfying a minimum reception quality for a corresponding transmission area may be determined as a transmitting vehicle for the corresponding transmission area. In this manner, transmitting vehicles are assigned to all transmission areas, respectively, to satisfy a minimum reception quality.

In operation 1720, the leader vehicle of the host platoon may perform a control operation so that the transmitting vehicles assigned to the respective transmission areas transmit signals. For example, the leader vehicle of the host platoon may transmit information indicating transmission, information regarding transmission target areas, and traveling related information of the host platoon, which is to be included in a transmission message, to the transmitting vehicles. Based on at least one of the received information, the leader vehicle of the host platoon may transmit signals to the transmission areas.

As such, when signals are transmitted to a plurality of platoons, transmitting vehicles are assigned to the respective platoons and therefore it is possible to transmit signals to the plurality of platoons effectively.

Figure 18:
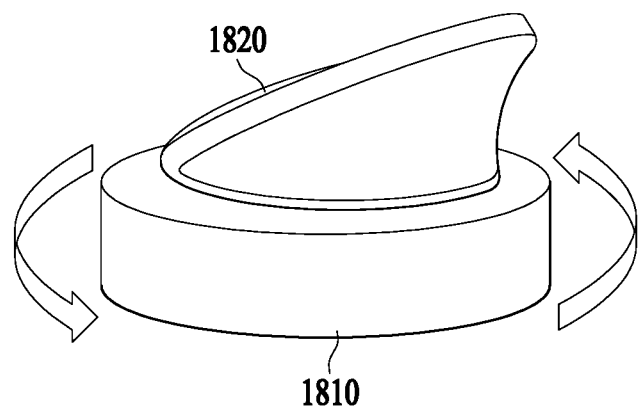
FIG. 18 is a diagram illustrating an antenna capable of changing a main transmit direction according to an embodiment of the present disclosure.

FIG. 18 is a diagram illustrating an antenna capable of changing a main transmit direction according to an embodiment of the present disclosure.

Referring to FIG. 18, an antenna capable of performing signal transmission an embodiment of the present disclosure is illustrated.

In an embodiment, the antenna in the embodiment includes a rotating part 1810 and a signal transmitter 1820. The signal transmitter 1820 may be coupled with the rotating part 1810 and rotate along with the rotating part 1810. The signal transmitter 1820 may transmit a signal in a specific direction through beamforming and may change heading of the signal transmitter 1820 in accordance with rotation of the rotating part 1810.

As such, by controlling the heading of the antenna, it is possible to control the antenna to transmit a signal in a specific direction.

For example, when there is need to transmit signals based on a priority order of a plurality of receiving vehicles that need to receive signals, the signals may be sequentially transmitted to the receiving target vehicles by controlling heading of the antenna. Hereinafter, a vehicle to receive a signal is referred to as a "receiving vehicle."

In addition, when it is difficult to transmit signals to the plurality of receiving vehicles within a required time due to limitation to a rotating speed of the rotating part 1810, signal transmission may be performed by controlling the heading of the antenna in a direction corresponding to a vehicle positioned farthest away among the receiving vehicles or by controlling heading of the antenna in a direction corresponding to an area in which an average difference of directions of the receiving vehicles is the smallest.

In addition, in an embodiment, when rotation of the rotating part 1810 is controlled, the rotation of the rotating part 1810 may be controlled using map information corresponding to a predicted route of travel of a vehicle.

In addition, in an embodiment, beamforming may be performed in a different manner according to a type of a message to be transmitted. For example, when omnidirectional transmission is needed, beamforming may not be performed in a specific direction and the antenna may be controlled to transmit signals in all directions.

Meanwhile, in an embodiment, a message allowed to be transmitted through an antenna may include a V2X safety message. In addition, information regarding an adjacent platoon and map information may be also transmitted to another node through the antenna.

Figure 19:
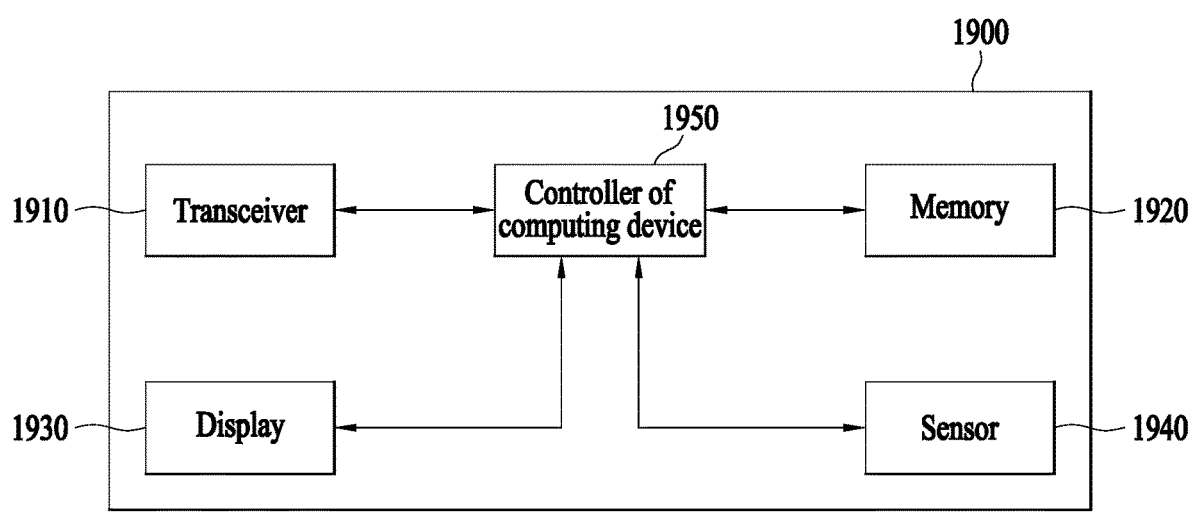
FIG. 19 is a diagram illustrating a computing device according to an embodiment of the present disclosure.

FIG. 19 is a diagram illustrating a computing device according to an embodiment of the present disclosure.

Referring to FIG. 19, a computing device 1900 may include at least one of a transceiver 1910, a memory 1920, a display 1930, a sensor 1940, and a controller 1950 for controlling the computing device 1900. In an embodiment, the computing device 1900 may perform an operation associated with control of a vehicle and may be installed in the vehicle or connected to the vehicle through wired or wireless communication.

The transceiver 1910 may communicate with at least one of another vehicle or a base station. For example, the transceiver 1910 may communicate with a camera associated with a server. In addition, in an embodiment, the transceiver 1910 may include a device for performing wireless communication.

The memory 1920 may store at least one of information transmitted and received through the transceiver 1910 or information input to the computing device 1900. Data information processed through control or additional learning of the controller 1950 may be stored in the memory 1920 as well. The memory 1920 may include a non-volatile memory and may include a medium for storing information electronically.

The display 1930 may visually provide information regarding an operation of the computing device 1900. For example, when communicating with another vehicle driving in a platoon, the computing device 1900 may provide information regarding the communication on the display 1920. In addition, the display 1930 may be provided together with a speaker and provide user with audio information.

The sensor 1940 may acquire information related to driving of a vehicle. In an embodiment, the sensor may include at least one of a radar, a lidar, a proximity sensor, a GPS, a speed sensor, an acceleration sensor, or a camera. Using the sensor 1940, it is possible to acquire physical information regarding driving of the vehicle, and may acquire information regarding an adjacent vehicle of the vehicle. For example, information such as a size, a speed, and a direction of the adjacent vehicle may be acquired using the sensor 1940.

The controller 1950 may control other components of the computing device 1900 and may include at least one processor. The controller 1950 may control the computing device 1900 to control at least one operation of the computing device 1900 of the vehicle.

According to an embodiment of the present disclosure, it is possible to enable effective signal transmission between vehicles. More specifically, it is possible to identify a position of a target vehicle through information exchange between vehicles and to control at least one of antenna heading, beamforming, and transmit power to transmit a signal to the identified position, so that the signal may be transmitted to the target vehicle.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A communication method of a mobile communication terminal, the method comprising:
    identifying at least one target platoon for signal transmission based on (i) a first lane corresponding to the at least one target platoon and (ii) a second lane to be traveled by a platoon to which a vehicle corresponding to the mobile communication terminal belongs;
    acquiring driving information of the identified at least one target platoon;
    determining antenna heading according to the acquired driving information; and
    transmitting, based on the determined antenna heading, a signal to the at least one target platoon.

2. The communication method of claim 1, wherein determining the antenna heading comprises:
    determining, based on the driving information of the at least one target platoon, a position of a receiving vehicle, and
    determining, based on the determined position of the receiving vehicle, the antenna heading.

3. The communication method of claim 1, wherein transmitting the signal comprises:
    determining a beamforming vector corresponding to the driving information of the at least one target platoon, and
    transmitting the signal based on the determined beamforming vector.

4. The communication method of claim 1, wherein:
    identifying the at least one target platoon comprises:
        identifying at least one adjacent platoon; and
        identifying, based on driving information of the platoon to which the vehicle corresponding to the mobile communication terminal belongs, the at least one target platoon from the identified at least one adjacent platoon, and
    wherein the first lane is partially overlapped with the second lane.

5. The communication method of claim 4, wherein identifying the at least one adjacent platoon comprises:
    considering driving information of the at least one adjacent platoon, and
    considering a relative speed of the platoon to which the vehicle corresponding to the mobile communication terminal belongs.

6. The communication method of claim 1, wherein the at least one target platoon comprises a first platoon and a second platoon,
    wherein the communication method further comprises assigning, based on driving information of the first platoon, driving information of the second platoon, and driving information of the platoon to which the vehicle corresponding to the mobile communication terminal belongs, priorities to the first platoon and the second platoon,
    wherein assigning priorities to the first platoon and the second platoon comprises assigning the first platoon a higher priority than the second platoon based on the first platoon approaching at a higher speed to the platoon to which the vehicle corresponding to the mobile communication terminal belongs, and wherein transmitting the signal comprises sequentially transmitting, based on the assigned priorities, the signal to the first platoon and the second platoon.

7. The communication method of claim 1, further comprising identifying, based on the driving information of the at least one target platoon, a transmitting vehicle configured to transmit a signal to the at least one target platoon from the platoon to which the vehicle corresponding to the mobile communication terminal belongs.

8. The communication method of claim 7, further comprising, based on the transmitting vehicle being different from the vehicle corresponding to the mobile communication terminal, transmitting, to the transmitting vehicle, information to be included in the signal.

9. The communication method of claim 1, wherein:
determining the antenna heading comprises determining the antenna heading based on a driving speed change of a vehicle corresponding to the mobile communication terminal, and
transmitting the signal comprises:
transmitting the signal based on a beamforming vector that is determined based on a driving speed change of the platoon to which the vehicle corresponding to the mobile communication terminal belongs, and
determining the beamforming vector, based on the antenna heading and the driving speed of the platoon to which the vehicle corresponding to the mobile communication terminal belongs, to control an effective transmission distance of the signal.

10. The method of claim 1, further comprising controlling a direction of an antenna to correspond to the antenna heading,
wherein the antenna heading is determined based on a speed of controlling the direction of the antenna.

11. A mobile communication terminal, comprising:
a transceiver; and
a controller configured to control the transceiver, identify at least one target platoon for signal transmission, acquire driving information of the identified at least one target platoon, determine antenna heading according to the acquired driving information, and transmit a signal to the at least one target platoon based on the determined antenna heading,
wherein the at least one target platoon is identified based on (i) a first lane corresponding to the at least one target platoon and (ii) a second lane to be traveled by a platoon to which a vehicle corresponding to the mobile communication terminal belongs.

12. The mobile communication terminal of claim 11, wherein the controller is further configured to determine a position of a receiving vehicle based on the driving information of the at least one target platoon, and determine the antenna heading based on the determined position of the receiving vehicle.

13. The mobile communication terminal of claim 11, wherein:
the controller is further configured to determine a beamforming vector corresponding to the driving information of the at least one target platoon, and
transmit the signal based on the determined beamforming vector.

14. The mobile communication terminal of claim 11, wherein:
the controller is further configured to identify at least one adjacent platoon, and identify the at least one target platoon from the identified at least one adjacent platoon based on driving information of the platoon to which the vehicle corresponding to the mobile communication terminal belongs, and
wherein the first lane is partially overlapped with the second lane.

15. The mobile communication terminal of claim 14, wherein:
the at least one adjacent platoon is identified by further considering driving information of the at least one adjacent platoon, and
considering a relative speed of the platoon to which the vehicle corresponding to the mobile communication terminal belongs.

16. The mobile communication terminal of claim 11, wherein
the at least one target platoon comprises a first platoon and a second platoon, wherein the controller is further configured to assign, based on driving information of the first platoon, driving information of the second platoon, and driving information of the platoon to which the vehicle corresponding to the mobile communication terminal belongs, priorities to the first platoon and the second platoon,
wherein assigning priorities to the first platoon and the second platoon comprises assigning the first platoon a higher priority than the second platoon based on the first platoon approaching at a higher speed to the platoon to which the vehicle corresponding to the mobile communication terminal belongs, and
wherein transmitting the signal comprises sequentially transmitting, based on the assigned priorities, the signal to the first platoon and the second platoon.

17. The mobile communication terminal of claim 11, wherein:
the controller is further configured to identify, based on the driving information of the at least one target platoon, a transmitting vehicle configured to transmit a signal to the at least one target platoon from the platoon to which the vehicle corresponding to the mobile communication terminal belongs.

18. The mobile communication terminal of claim 17, wherein the controller is further configured to, based on the transmitting vehicle being different from the vehicle corresponding to the mobile communication terminal, transmit, to the transmitting vehicle, information to be included in the signal.

19. The mobile communication terminal of claim 11, wherein:
the antenna heading is determined based on a driving speed change of a vehicle corresponding to the mobile communication terminal,
the signal is transmitted based on a beamforming vector that is determined based on the antenna heading and a driving speed change of the platoon to which the vehicle corresponding to the mobile communication terminal belongs, and
the beamforming vector is determined, based on the antenna heading and the driving speed of the platoon to which the vehicle corresponding to the mobile communication terminal belongs, to control an effective transmission distance of the signal.

20. The mobile communication terminal of claim 11, wherein:
the transceiver comprises an antenna, the controller is further configured to control a direction of the antenna to correspond to the antenna heading, and the antenna heading is determined based on a speed of controlling the direction of the antenna.

\* \* \* \* \*